United States Patent [19]

Ushida et al.

[11] Patent Number: 5,644,366
[45] Date of Patent: Jul. 1, 1997

[54] IMAGE REPRODUCTION INVOLVING ENLARGEMENT OR REDUCTION OF EXTRACTED CONTOUR VECTOR DATA FOR BINARY REGIONS IN IMAGES HAVING BOTH BINARY AND HALFTONE REGIONS

[75] Inventors: Katsutoshi Ushida; Teruya Hara, both of Yokohama, Japan

[73] Assignee: Canon Kabushiki Kaisha, Tokyo, Japan

[21] Appl. No.: 5,991

[22] Filed: Jan. 19, 1993

[30] Foreign Application Priority Data

| Jan. 29, 1992 | [JP] | Japan | 4-013632 |
| Jan. 31, 1992 | [JP] | Japan | 4-016339 |
| Jan. 31, 1992 | [JP] | Japan | 4-016341 |
| Jan. 31, 1992 | [JP] | Japan | 4-016343 |
| Jan. 31, 1992 | [JP] | Japan | 4-016344 |
| Jan. 31, 1992 | [JP] | Japan | 4-016345 |
| Jan. 31, 1992 | [JP] | Japan | 4-016346 |
| Jan. 31, 1992 | [JP] | Japan | 4-016347 |

[51] Int. Cl.⁶ .......... H04N 5/21; H04N 1/40; H04N 1/46; G06K 9/40
[52] U.S. Cl. .......... 343/625; 358/462; 358/534; 358/537; 382/176; 382/266; 382/198
[58] Field of Search .......... 382/22, 54, 176, 382/256, 266, 195, 197, 198; 358/534, 537, 538, 462, 464; 348/252, 253, 625, 628, 629, 630; H04N 5/21, 1/40, 1/46

[56] References Cited

U.S. PATENT DOCUMENTS

| 4,296,405 | 10/1981 | Rich ................... 340/143.3 AG |
| 4,307,377 | 12/1981 | Pferd et al. ................... 340/146.3 |
| 4,524,456 | 6/1985 | Araki et al. ................... 382/56 |
| 4,668,995 | 5/1987 | Chen et al. ................... 358/462 X |
| 4,797,945 | 1/1989 | Suzuki et al. ................... 382/56 |
| 4,953,114 | 8/1990 | Sato ................... 382/54 X |
| 5,023,919 | 6/1991 | Wataya ................... 382/54 |
| 5,050,222 | 9/1991 | Lee ................... 382/21 |
| 5,073,959 | 12/1991 | Sugiura et al. ................... 382/54 X |
| 5,073,960 | 12/1991 | Nakai et al. ................... 382/22 |
| 5,093,870 | 3/1992 | Watanabe ................... 382/54 X |
| 5,126,838 | 6/1992 | Oshawa et al. ................... 358/75 |
| 5,231,677 | 7/1993 | Mita et al. ................... 358/462 X |
| 5,235,436 | 8/1993 | Sakamoto et al. ................... 358/462 |
| 5,270,837 | 12/1993 | Chen et al. ................... 358/462 X |
| 5,296,939 | 3/1994 | Suzuki ................... 358/462 X |
| 5,304,988 | 4/1994 | Seto ................... 382/22 X |
| 5,309,521 | 5/1994 | Matsukawa ................... 382/22 |
| 5,317,679 | 5/1994 | Ueda et al. ................... 395/132 |

FOREIGN PATENT DOCUMENTS

| 0206853 | 12/1986 | European Pat. Off. ......... G06F 15/68 |
| 364264 | 10/1988 | European Pat. Off. ......... H04N 1/32 |
| 0378754 | 7/1990 | European Pat. Off. ......... G06F 15/72 |
| 0415648 | 3/1991 | European Pat. Off. ......... G06F 15/66 |
| 451722 | 10/1991 | European Pat. Off. ......... H04N 1/32 |
| 0482862 | 4/1992 | European Pat. Off. ......... G06F 15/62 |
| 61-099461 | 9/1986 | Japan ......... H04N 1/40 |
| 2183429 | 6/1987 | United Kingdom ......... G06F 15/66 |

OTHER PUBLICATIONS

IEE Proceedings–E, vol. 127, No. 4, Jul. 1980, Stevenage, GB pp. 143–147, "Fast Generation Chain Code" B.G. Batchelor et al.

Primary Examiner—John K. Peng
Assistant Examiner—John W. Miller

[57] ABSTRACT

When an image is input, that input image is separated into a halftone region, such as a photograph, and a binary region, such as a character/line. Contour vector data along an edge of the separated binary image region is extracted. Regarding the binary image region, when the input image is to be enlarged or reduced and then output, individual coordinates in the extracted contour vector data are enlarged or reduced to reproduce the binary image.

98 Claims, 28 Drawing Sheets

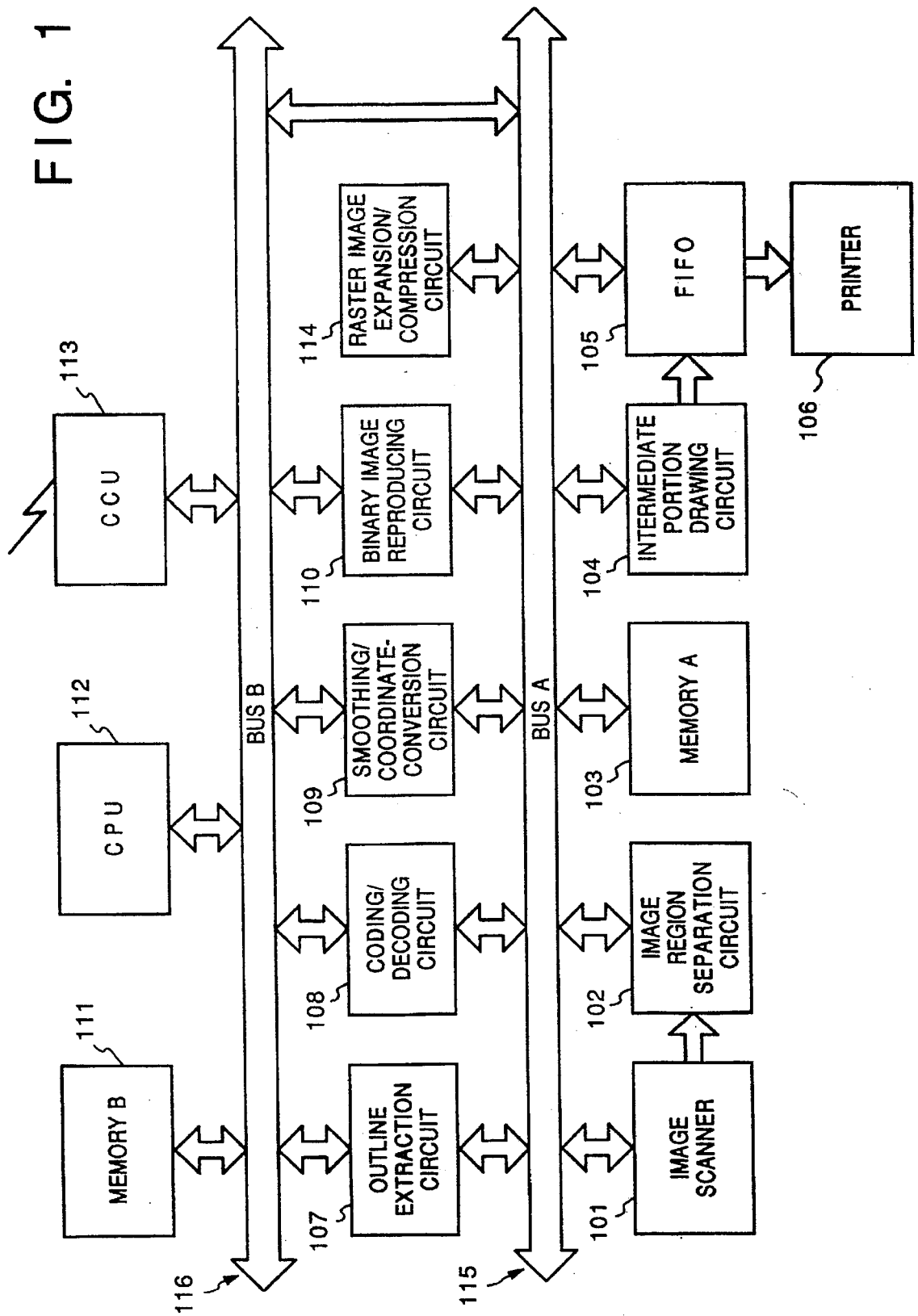

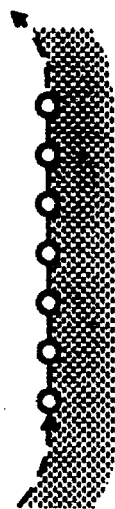
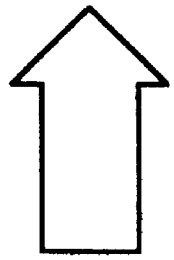
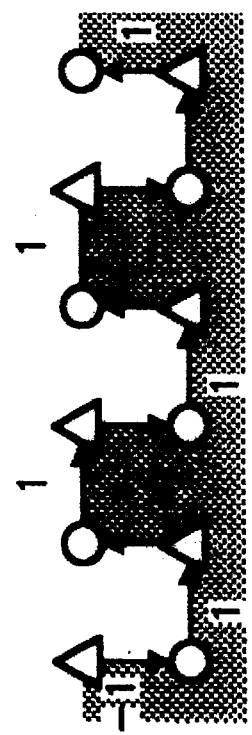
FIG. 15

$|D_i| \geq 3$ & $D_{i-1} \cdot D_{i+1} > 0$ $|D_i| > |D_{i-2}| + |D_{i+2}|$
$(|D_{i-1}| = |D_{i+1}| = 1)$ MEAN LOAD APPLIED $Q_i(x'_i, y'_i) = \frac{1}{4} \cdot P_{i-1}(x_{i-1}, y_{i-1})$
$+ \frac{1}{2} \cdot P_i(x_i, y_i)$
$+ \frac{1}{4} \cdot P_{i+1}(x_{i+1}, y_{i+1})$

THAT IS, $x'_i = \frac{1}{4} \cdot x_{i-1} + \frac{1}{2} \cdot x_i + \frac{1}{4} \cdot x_{i+1}$
$y'_i = \frac{1}{4} \cdot y_{i-1} + \frac{1}{2} \cdot y_i + \frac{1}{4} \cdot y_{i+1}$ $x'_1 = \frac{1}{4} \cdot 1 + \frac{1}{2} \cdot 2 + \frac{1}{4} \cdot 4$
$= 9/4$
$y'_1 = \frac{1}{4} \cdot 3 + \frac{1}{2} \cdot 2 + \frac{1}{4} \cdot 1$
$= 2$

HORIZONTAL VECTOR TABLE

| | X | Y | INFLOW | OUTFLOW |
|---|---|---|---|---|
| 0 | 1.5 | 2.5 | 1 | 0 |
| 1 | 2.5 | 3.5 | 0 | 1 |

VERTICAL VECTOR TABLE

| | X | Y | INFLOW | OUTFLOW |
|---|---|---|---|---|
| 0 | 2.5 | 2.5 | 0 | 1 |
| 1 | 1.5 | 3.5 | 1 | 0 |

FIG. 24B

HORIZONTAL VECTOR TABLE

| | X | Y | INFLOW | OUTFLOW |
|---|---|---|---|---|
| 0 | 1.5 | 2.5 | 1 | 0 |
| 1 | 2.5 | 3.5 | 0 | 1 |
| 2 | 3.5 | 2.5 | 2 | * |

VERTICAL VECTOR TABLE

| | X | Y | INFLOW | OUTFLOW |
|---|---|---|---|---|
| 0 | 2.5 | 2.5 | 0 | 1 |
| 1 | 1.5 | 3.5 | 1 | 0 |
| 2 | 3.5 | 3.5 | * | 2 |

FIG. 24C

HORIZONTAL VECTOR TABLE

| | X | Y | INFLOW | OUTFLOW |
|---|---|---|---|---|
| 0 | 1.5 | 2.5 | 1 | 0 |
| 1 | 2.5 | 3.5 | 0 | 1 |
| 2 | 3.5 | 2.5 | 2 | 3 |
| 3 | 5.5 | 3.5 | 3 | 2 |

VERTICAL VECTOR TABLE

| | X | Y | INFLOW | OUTFLOW |
|---|---|---|---|---|
| 0 | 2.5 | 2.5 | 0 | 1 |
| 1 | 1.5 | 3.5 | 1 | 0 |
| 2 | 3.5 | 3.5 | 3 | 2 |
| 3 | 5.5 | 2.5 | 2 | 3 |

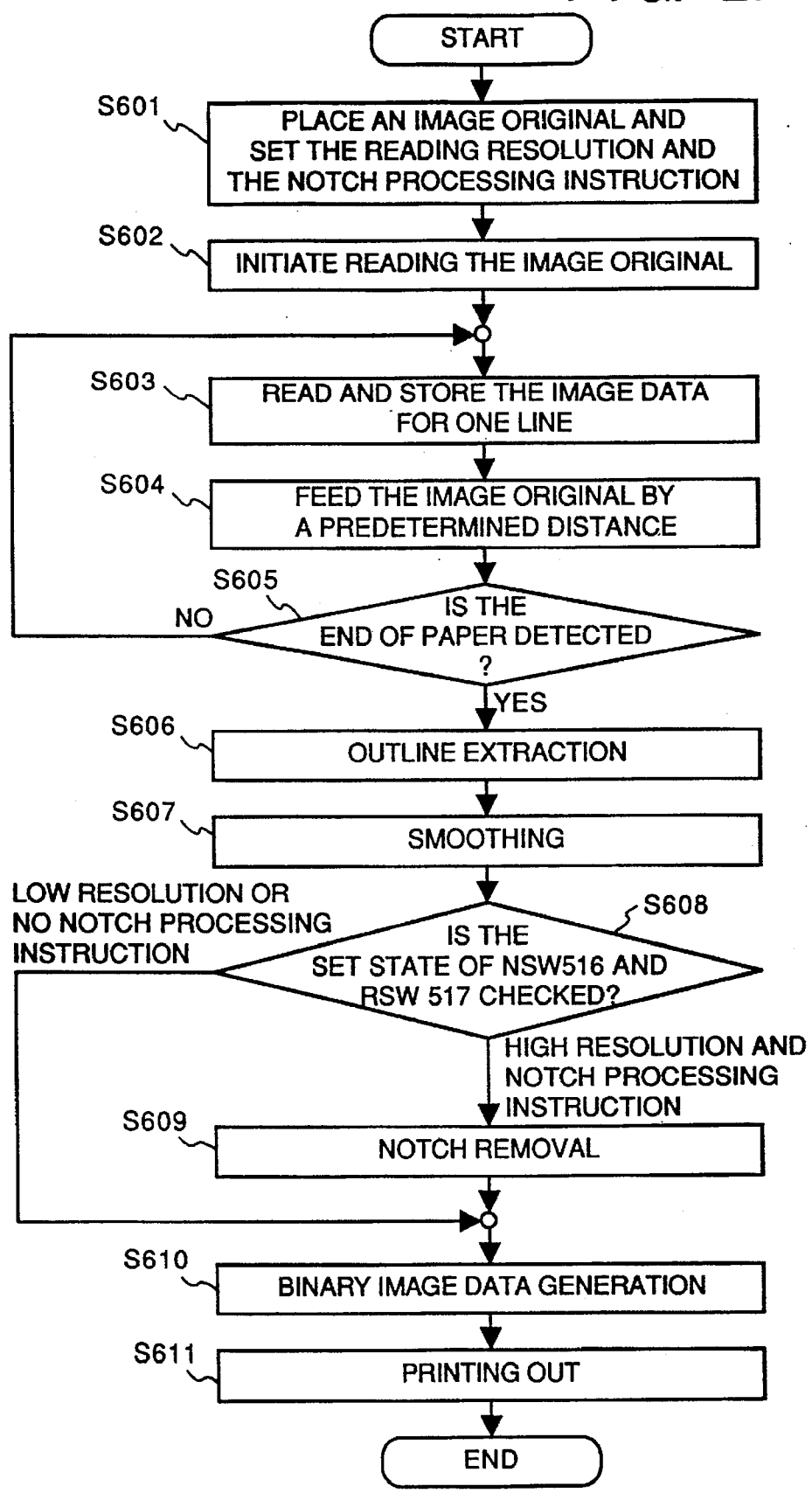

IMAGE REPRODUCTION INVOLVING ENLARGEMENT OR REDUCTION OF EXTRACTED CONTOUR VECTOR DATA FOR BINARY REGIONS IN IMAGES HAVING BOTH BINARY AND HALFTONE REGIONS

BACKGROUND OF THE INVENTION

The present invention relates to an image processing apparatus and a method thereof, and more particularly, to an image processing apparatus which is designed to input image data and output it to a predetermined device and a method thereof.

In conventional image processing apparatus, such as a facsimile machine, an image is read by an image scanner, and each of the pixels of the raster scanned image is then expressed by binary data which is either white or black. For the telecommunication of the raster scanned binary image data, the raster scanned binary image is coded by the MH, MR or MMR method and then transmitted. Therefore, in the conventional facsimile machine, image data is internally handled by a set of raster scanned binary pixel data. When the resolution of the image read at the transmission side and the resolution of the reception side differ from each other, e.g., when the image read by the G3 machine (8 pel/mm in the horizontal direction and 7.7 line/mm in the vertical direction) is transmitted to a facsimile machine which has a standard recording resolution (8 pel/mm in the horizontal direction and 3.85 line/mm in the vertical direction), or when the paper size of the received image and that of the output image differ from each other, e.g., when the image received in B4 size is output to a sheet of recording paper having A4 size, the image data coded by the MH, MR or MMR method is converted into raster scanned binary image data, and then expansion (enlargement) or compression (reduction) is performed by simply double-writing each of the pixels (by writing the same pixel at least twice) or by thinning out the pixels.

However, in the above-described conventional image processing apparatus, when image data of a low resolution is recorded in the form of an image of a high resolution (which is internally the expansion/compression process of the image), e.g., when the image of 200 dpi is recorded on a sheet of recording paper of 400 dpi, the slanting contour line may be notched because of the simple doubling of each of the pixels. Furthermore, when a resolution conversion of about 200% is performed, e.g., when an image of the G3 resolution is converted into an image having the G4 resolution which is 200 dpi in both the horizontal and vertical directions, the image may be distorted because of the double thinning of each of the pixels.

Furthermore, in the conventional image processing apparatus, the quality of the original image data generated when an image original is read by a scanner may deteriorate due to the noises superimposed on the image signal generated by the scanner, that is, the image which is originally straight may be notched or black notches may appear on the white. In order to prevent such a deterioration in the image, attempts have been made to suppress the noise level of the image signal or to provide a mechanism of making the feed of the image original smooth. However, either of these methods has an deficiency.

SUMMARY OF THE INVENTION

In view of the aforementioned problems of the conventional techniques, an object of the present invention is to provide an image processing apparatus and an image processing method which enable an optimum expansion/compression process to be performed on a character/line image and a halftone image.

Another object of the present invention is to provide an image processing apparatus and an image processing method which enable a high-definition image to be reproduced when an input image is reproduced by a predetermined device.

Another object of the present invention is to provide an image processing apparatus and an image processing method which enable a high-definition image to be reproduced when an input image is reproduced by a predetermined device, and which allow for at least reproduction of the image even when there is a limitation to the capacity of a memory used for the reproduction process.

Another object of the present invention is to provide an image processing apparatus and an image processing method which enable an objective image or an objective region in an image to be determined as a halftone image or a binary image on the basis of contour vector of the image extracted during image processing without providing a circuit for determining whether the input image is a halftone image or a binary image or which region in the input region is a halftone image or an binary image.

Another object of the present invention is to provide an image processing apparatus and an image processing method which enable an excellent image to be generated even when the expansion/compression process is performed on the image and which enable an image to be output in a desired size with respect to each of the axes of an orthogonal coordinate system.

Another object of the present invention is to provide an image processing apparatus and an image processing method which enable a high-definition image to be output by a predetermined device and which enable a reduction in the processing ability of the device to be restricted as much as possible.

Another object of the present invention is to provide an image processing apparatus and an image processing method which enable notch removal to be performed while taking various conditions, such as an image input resolution or the desire of a user, into consideration.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram of a first embodiment of an image processing apparatus according to the present invention;

FIG. 15 shows another example of a processing of the first smoothing circuit in the first embodiment;

FIGS. 24A through 24C show the transition of the horizontal and vertical rough contour vectors based on the input image shown in FIG. 23;

FIG. 27 is a flowchart showing the operation of the image processing apparatus of FIG. 26.

DETAILED DESCRIPTION OF THE PREFERRED EMBODIMENTS

Figure 2A:
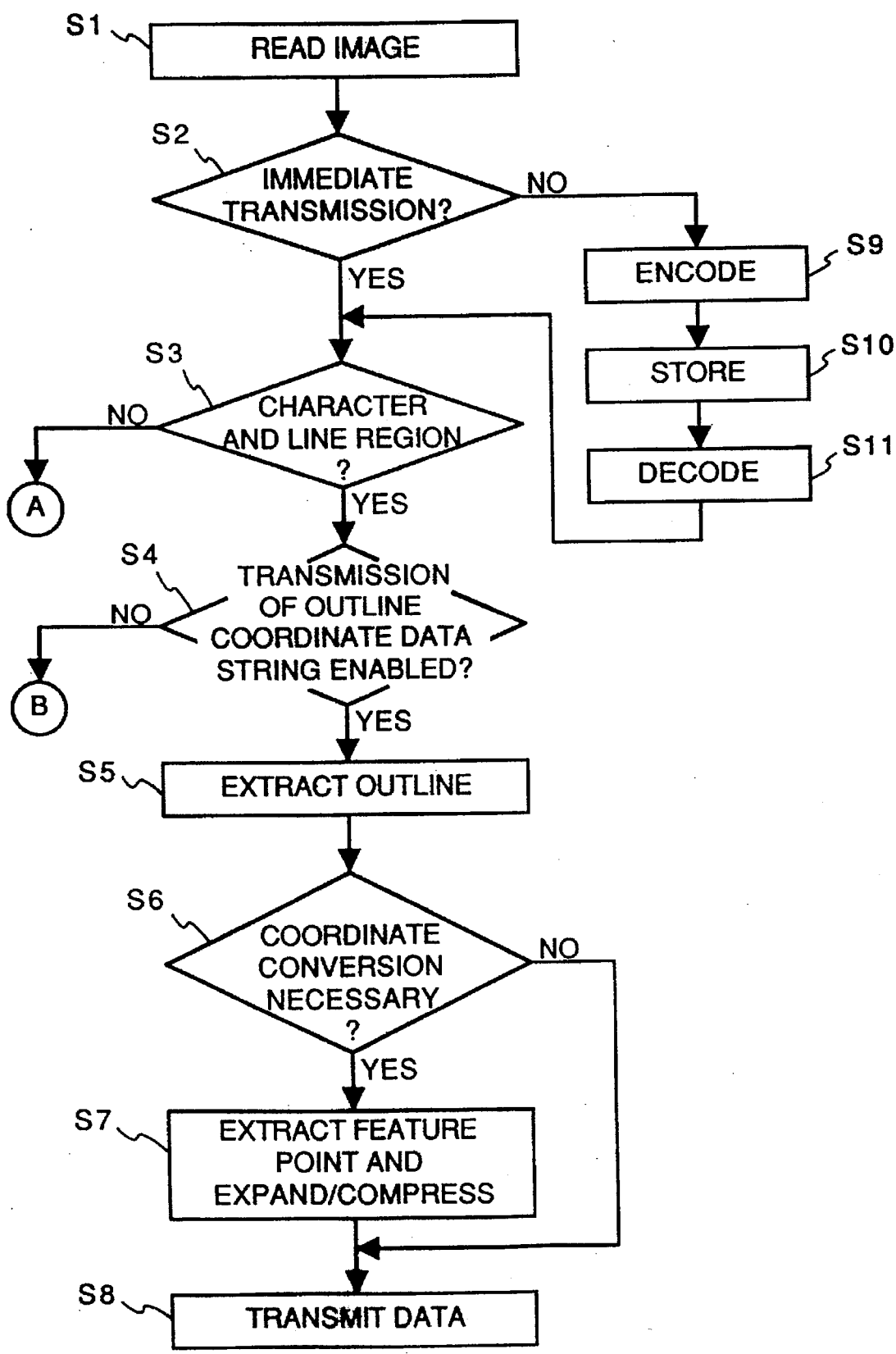
FIGS. 2A through 2C are flowcharts showing the transmission process executed in the first embodiment.

Embodiments of the present invention will be described with reference to the accompanying drawings.

A first embodiment of the present invention will be described.

Structure of Apparatus

FIG. 1 is a block diagram which illustrates an image processing and communication apparatus according to a first embodiment. Referring to FIG. 1, reference numeral 101 denotes an image scanner for A/D converting image data read by a photoelectric conversion device such as a CCD in the sequential order to raster scanning operation. The digital multi-value data converted by A/D conversion is binarized so as to transmit binary raster image data to a bus A115. Binary raster image data transmitted to the bus A is temporarily stored in a memory A103.

Reference numeral 102 denotes an image region separation circuit which receives raster scanned multi-value data (for example, 8 bit/pixel in the case where 256 gradations for one pixel) supplied from the image scanner 101, and separates half tone regions and character and line regions from one another so as to cause an image region separation table (to be described later) for each image region to be formed in the memory A103. It should be noted that the binary images such as the characters and lines and the half tone images can be discriminated by examining the value of supplied multi-value data. Since a binary image usually has only white (the lowest density) and black (the highest density), the density is rapidly changed in the regions (edges) in which the two states are position adjacently. On the contrary, the density is changed moderately in the half tone image because the density is gradually changed. Hence, a discrimination can be made as to whether or not the subject pixel is positioned in the edge of the binary image or in the edge of the half tone image. Incidentally, the technology to distinguish the binary image such as the character and lines and the half tone image has a known technology, and it can be realized by another operation. Another structure may be employed in which the type or the like of the read original document may be instructed by an operation.

Reference numeral 107 denotes an outline extraction circuit which reads binary raster image data stored in the memory A103 and reads, if necessary, the image separation table for separating the image regions so as to form outline coordinate data strings in a memory B111.

Reference numeral 108 denotes a coding/decoding circuit which reads binary raster image data stored in the memory A103, and encodes and compresses the MH, MR or MMR binary image so as to cause the memory B111 to store the encoded image data in the case where the encoding process is performed. In the case where the decoding process is performed, the coding/decoding circuit 108 receives encoded image data stored in the memory B111 so as to transmit decoded binary raster image data to the memory A103.

Reference numeral 109 denotes a smoothing and coordinate conversion circuit which receives the outline coordinate data strings stored in the memory B111 so as to perform a variety of coordinate conversion processes (multiplication with a ratio of expansion or compression and interchanging x- with y-coordinates and the like) and the smoothing process for smoothing the rough (jagged) portion of the outline generated at the time of the enlargement. Then, the smoothing and coordinate conversion circuit 109 forms converted outline coordinate data strings in the memory B111.

Reference numeral 113 denotes a communication control circuit (CCU) which receives image data (the outline coordinate data strings, or image encoded data and, if necessary, the region separation table) stored in the memory B111 so as to transmit image data to the data line. The communication control circuit (CCU) 113 causes image data received through the data line to be stored in the memory B111.

Reference numeral 110 denotes a binary image reproducing circuit which receives the outline coordinate data strings stored in the memory B111, and which draws an outline in the memory A103 in accordance with outline coordinate data so as to form a binary raster image (a bit map image).

Reference numeral 104 denotes an inside drawing circuit which receives the binary raster image (the bit map image) in the memory A103 formed by drawing the outline, and which draws the closed region surrounded by the outline so as to transmit the thus formed image to an FIFO memory 105.

The FIFO memory 105 again horizontally and vertically synchronizes with the printer so as to transmit binary raster image data to the printer 106.

Reference numeral 106 denotes a printer such as an LBP printer which receives binary raster image data, which has been again synchronized with the FIFO 105, so as to record image data on a recording paper sheet.

Transmission Process

Figure 2B:
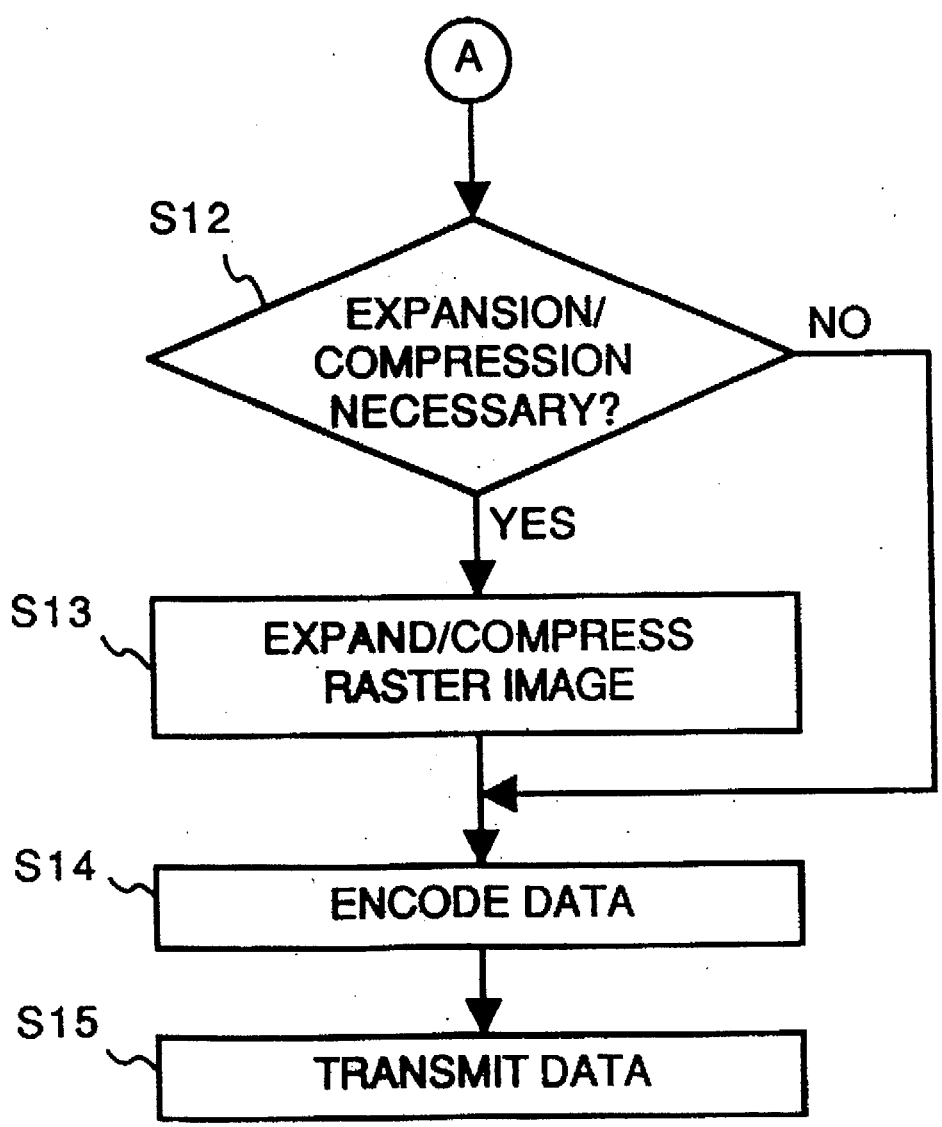
Figure 2C:
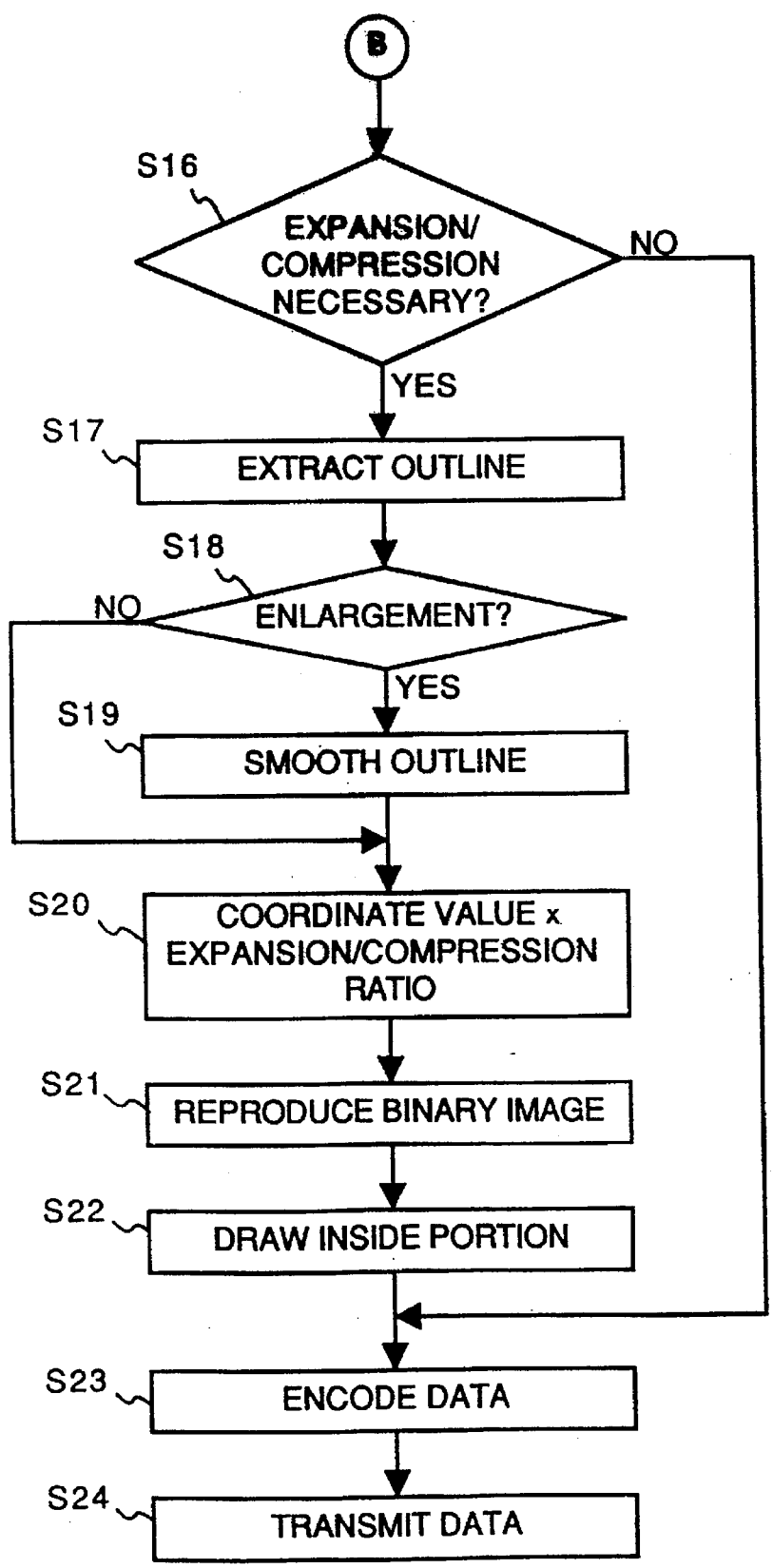
Figure 3A:
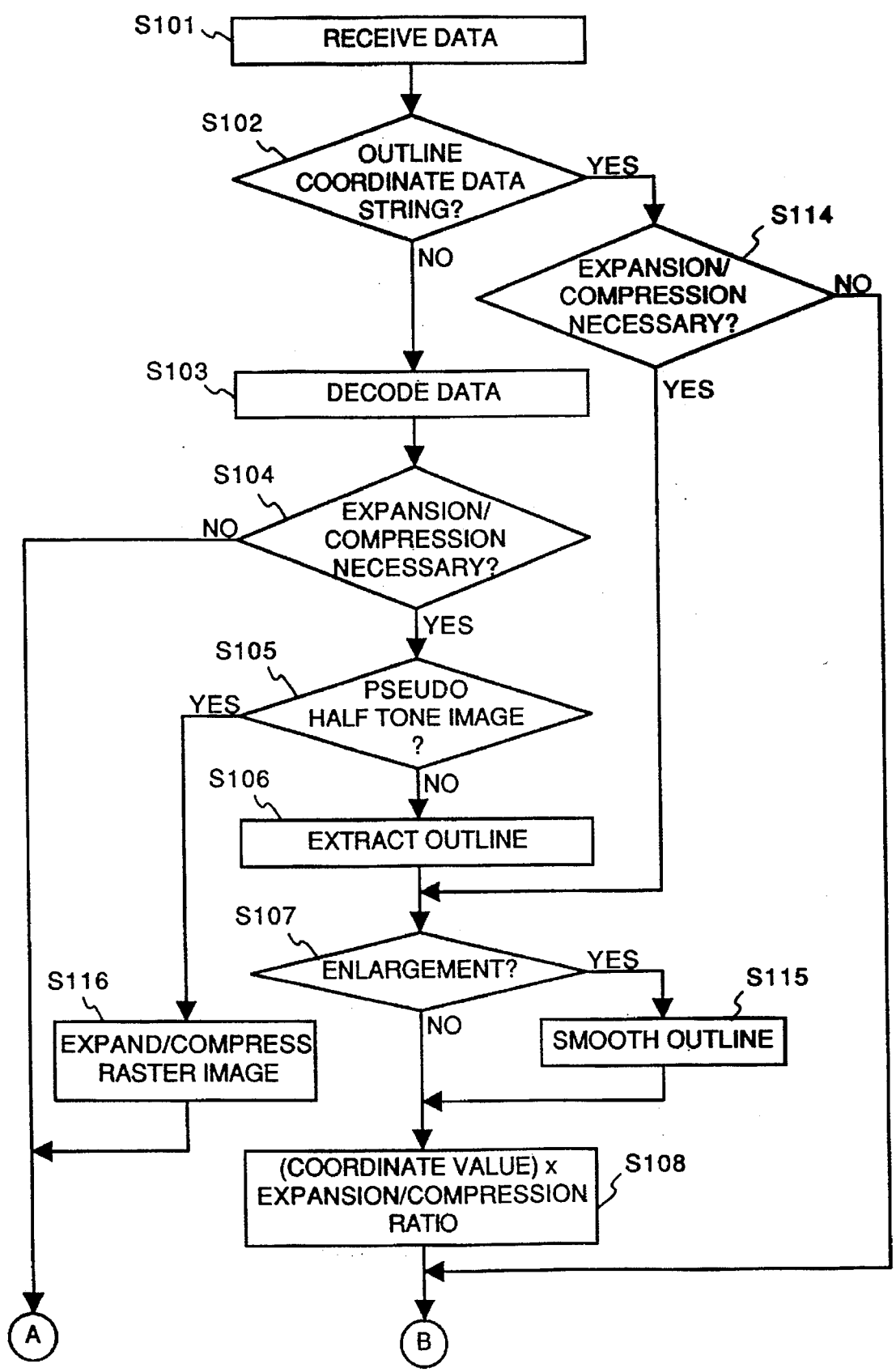
FIGS. 3A through 3B are flowcharts showing the reception process executed in the first embodiment.
Figure 3B:
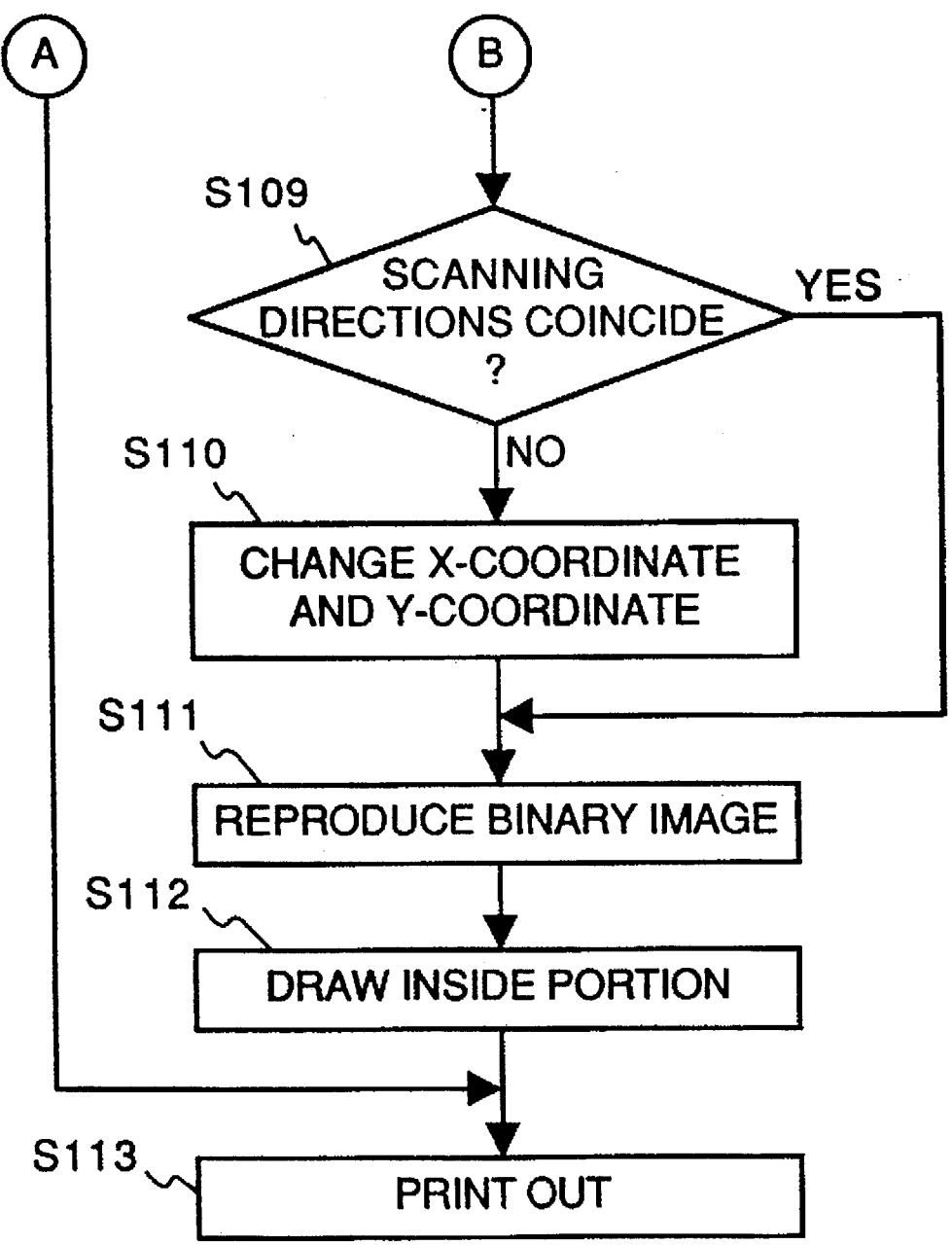
Figure 4:
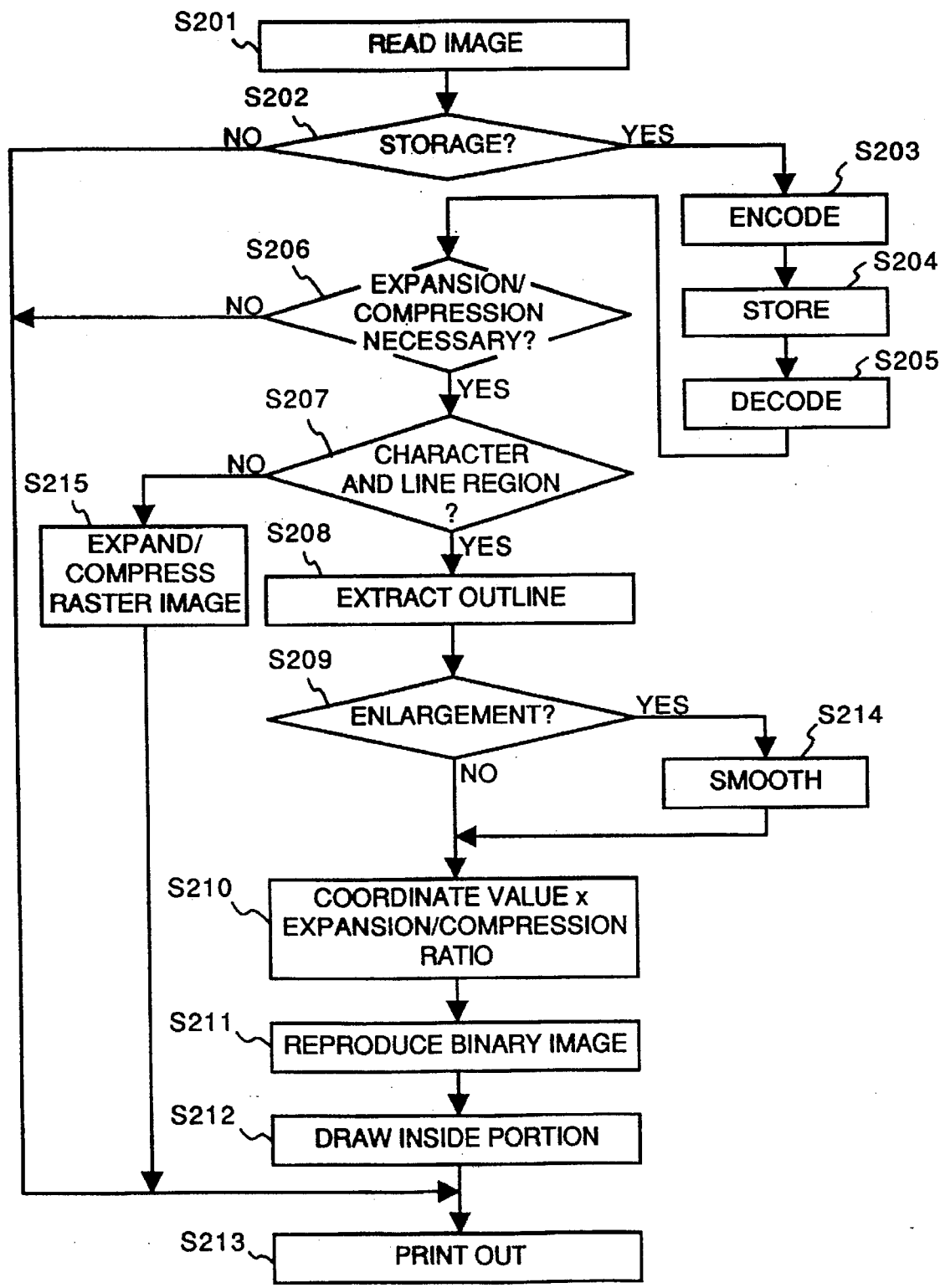
FIG. 4 is a flowchart showing the copying process executed in the first embodiment.

The flow of image data in the image processing and communication apparatus according to this embodiment, that is, the transmission operation will now be described with reference to a flow chart shown in FIGS. 2A to 2C, the receiving operation will be described with reference to a flow chart shown in FIGS. 3A to 3B, and the copying operation will be described with reference a flow chart shown in FIG. 4.

In step S1, an image is, as binary raster image data, read by the image scanner 101 so as be transferred and stored in the memory A103. In the case other than the immediate transmission, that is, if the transmission of image data is not performed immediately, image data stored in the memory A103 is encoded and compressed by the coding/decoding circuit 108, the encoded and compressed data is stored in the memory B111 as an image file, and it is decoded at the time of transmission before it is developed in the memory A103 as a binary raster image as shown in steps S9, S10 and S11, so that the memory is effectively utilized. Simultaneously with the storage of the binary raster image, multi-value raster image data obtained by the image scanner is transmitted to the image region separation circuit 102. The image region separation circuit 102 discriminates whether the subject portion is the character and line region or the half tone region for each block (a predetermined region) so as to form, in the memory A103, a region discrimination table showing the characteristics of the image region. The encoded image data file, which has been stored, and the region discrimination table file, of course, have the same file attribute and they are taken out when they are required.

In the case where it is apparent that pseudo half tone is used in accordance with whether or not a selection button (a half tone button provided in an operation portion omitted from illustration) for selecting whether or not a pseudo half tone process is performed at the time of the binary coding process is depressed, the image region separation table for each image region is not formed, but only the image attribute showing whether the pseudo half tone or the character/line is recorded by a quantity of one page.

In step S3, the region discrimination table showing whether the character/line region or the pseudo half tone region is read from the memory A103. If the subject region is the character/line region, the flow proceeds to step S4. If it is the half tone region, the flow is branched to step S12. If the discrimination is made that the subject region is the half tone region and the flow proceeds to step S12, a discrimination is made that expansion/compression must be performed, the expansion/compression process for each raster, which is the process of expanding/compressing the binary raster image, is performed similarly to the convention G3 or G4. Then, coding so as to be adaptable to the data line is performed, and image data is transmitted.

If the image region discrimination table is transmitted at this time, the region discrimination table stored in the memory A103 is transferred to the memory B111 so as to be transmitted.

If a discrimination is made in step S4 that outline coordinate data strings can be transmitted because the receiving side has a function of reproducing the binary raster image from the outline coordinate data strings, the aforesaid fact is notified from the receiving side to the transmission side, and the flow proceeds to step S5. If the receiving side is constituted by only the function of conventional G3 or G4 and therefore it cannot receive the outline coordinate data strings, the flow proceeds to step S16. In step S16, a discrimination is made as to whether or not the expansion/compression must be performed. If it must be performed, the flow proceeds to step S17 in which the expansion/compression process is performed in accordance with the outline coordinate data strings. If it does not need to be performed, the flow proceeds to step S23 in which the coding process is performed before image data is transmitted.

In step S17, binary raster image data stored in the memory A103 is supplied to the outline extraction circuit 102, and binary raster image data is converted into the outline coordinate data strings. Then, the outline coordinate data strings are stored in the memory B111. In step S18, a discrimination is made as to whether or not a process of enlarging the outline coordinate data strings stored in the memory B111 must be performed. If the enlargement process must be performed, the flow proceeds to step S19. If it does not need to be performed, the flow proceeds to step S20.

In step S19, the outline coordinate data strings supplied from the memory B111 are received so as to perform an outline smoothing process to be described later is performed, and then the flow proceeds to step S20. In step S20, each coordinate value is multiplied by a ratio of expansion/compression so as to be converted into coordinate values adapted to the transmissible resolution. In step S21, the converted outline coordinate data strings are transmitted to the binary image reproducing circuit 111 from the memory B111 so as to draw the outline on the bit map image stored in the memory A103. In step 22, the image bit map, the outline of which has been drawn by the inside drawing circuit 104, is taken for each raster so as to develop it in the memory A103 as a binary raster image which has been subjected to the inside drawing process.

In step S23, the aforesaid image data is coded so as to be adapted to the communication mode is performed by the coding/decoding circuit 108, so that coded data is transmitted to the memory B111. If the G4 mode is employed, coded image data, which has been transmitted to the memory B111, is transmitted by the CCU 113. In the case of the G3 mode, a MODEM (omitted from the illustration) is used to transmit the coded image data.

Processes on and after step S5 will now be described. If the image region to be transmitted is the character/line image and the receiving side is able to receive outline coordinate data, the flow proceeds to step S5. Image data transferred as the character/line region to the outline extraction circuit 107 from the memory A103 is subjected to a process in which all of its pixels are scanned while updating a rough outline coordinate data table, and image data is finally converted into the outline coordinate data strings which are stored in the memory B111. In step S6, a discrimination is made as to whether or not the expansion/compression of image data converted into the outline coordinate data strings must be performed. If the expansion/compression must be performed, the flow proceeds to step S7 in which image data stored in the memory B111 is transferred to the to the smoothing/coordinate conversion circuit 109 so as to multiply the coordinate values by a ratio of expansion/compression. If necessary, the coordinate strings are traced so as to leave a featured point in the outline coordinate data strings. If the enlargement process is performed, the smoothing conversion operation is performed. If a discrimination is made as a result of tracing that image can be restored by the smoothing process, the effective number of digits of the coordinate value of coordinate data is decreased, so that the quantity of data is compressed. Then the outline coordinate data strings, the coordinates of which have been converted by the smoothing/coordinate conversion circuit 109, are returned to the memory B111. In step S8, image data, the transmissive resolution and the receipt resolution are made coincide with each other, is transmitted by the CCU 113. If the G3 mode is employed, it is similarly transmitted by a MODEM (omitted from illustration).

If occurrence of a communication error is taken into consideration, the outline coordinate data strings can be transmitted and received by correcting a protocol error and by again transmitting the image which has encountered an error in the case where the image is communicated as the outline coordinate data if the G4 CCU is employed as the communication apparatus. In the case where the G3 communication apparatus is employed which uses the MODEM, data transmission and receipt must be performed by using HDLC in the ECM. Therefore, the outline coordinate data strings are transmitted and received in accordance with the G3 procedure through the MODEM by using a conventional telephone line, a forced ECM mode is realized, and switching to an image data transmission, which uses the conventional MH and MR codes, is performed and the conventional G3 mode is employed to communicate the image if the re-transmission of the ECM takes place frequently due to the state of the data line, or if the ECM transmission and receipt cannot be performed.

Receiving Process

The receipt process to be performed by the apparatus according to this embodiment will now be described with reference to a flow chart shown in FIGS. 3A and 3B.

In the receipt operation to be performed in step S101, the CCU 113 or a MODEM (omitted from illustration) is used to receive image data. The received image is MH, MR or G4 coded image data formed in accordance with the conventional G3 procedure or the outline coordinate data strings transmitted by the image processing and communication apparatus according to this embodiment. Received image data is temporarily stored in the memory B111.

In step S102, a discrimination is made as to whether or not received image data is the outline coordinate data strings transmitted by an apparatus of the same type as the image processing and communication apparatus according to this embodiment.

If a discrimination is made that received image data is image data transmitted by the apparatus according to this embodiment, the flow branches to step S114. If a discrimination is made that it is MH, MR, or MMR coded data received from an ordinary facsimile apparatus, the flow proceeds to step S103.

In step S114, a discrimination is made as to whether or not the expansion/compression of the received image data must be performed. If a discrimination is made that the expansion/compression must be performed, the flow proceeds to step S107 in which an expansion/compression process, in which the outline coordinate data strings are used, is performed. If the expansion/compression process does not need to be performed, the flow proceeds to step S109 in which a discrimination is made as to whether or not the scanning directions coincide with each other. Then, image data is again converted from the outline coordinate data strings to binary raster image data, and image data is printed out.

If a discrimination is made that received image data is MH, MR or MMR-coded image data and the flow therefore proceeds to step S103, received data is transferred to the coding/decoding circuit 108 in which it is decoded to binary raster image data, and decoded data is stored in the memory A103. In next step S104, a discrimination is made that the expansion/compression must be performed when received image data is printed out. If a discrimination is made that the expansion/compression must be performed, the flow proceeds to step S105. If it does not need to be performed, the flow proceeds to step S113 in which binary raster image data is transferred from the memory A103 to the FIFO 105 so as to be again synchronized with the printer 106, and then, binary raster image data is printed out.

In step S105, a discrimination is made from the region discrimination (the image attribute or the region discrimination table) that received image data is a pseudo half tone image or a character/line image. Image data blocks discriminated to be the pseudo half tone image data are subjected to a process to be performed in step S116 in which the image blocks are transferred to the raster image expansion/compression circuit 114 so that the image blocks are expanded/compressed as a binary raster image. Image blocks discriminated to be the character/line region is transferred to the outline extraction circuit 107 in which the image blocks are, as outline coordinate data strings to be described later, subjected to a expansion/compression process.

In step S106, binary raster image data of a character/line image stored in the memory A103 is transferred to the outline extraction circuit 107 in which binary raster image data is converted into outline coordinate data strings so as to be stored in the memory B111.

In step S107, a discrimination is made as to whether or not either the sub-scanning or the main scanning is subjected to the enlargement process. If it is subjected to the enlargement process, the flow proceeds to step S115 in which the outline coordinate data strings stored in the memory B111 are transferred to the smoothing/coordinate-conversion circuit 109 so as to perform a first smoothing process and a second smoothing process in which tracing pattern matching of the outline coordinate strings is performed, so that outline coordinate data other than corner point is smoothed. As a result of this process, rough portions in diagonal lines formed at the time of the enlargement process can be smoothed. The term "corner point" used hereinbefore will be described later in detail but briefly it is meant a point, the coordinate position of which is not changed even it has been subjected to the smoothing process.

In step S108, each of the outline coordinate data strings or the outline coordinate data strings, the outlines of which have been smoothed, is multiplied with the ratio of expansion/compression, so that each coordinate string is converted into coordinate data which is adapted to the resolution of the printed output.

In step S109, a discrimination is made as to whether or not the image data scanning direction is different from the image scanning direction at the time of the recording process in the case where, for example, a B5 size image read longitudinally is outputted as a horizontal A4 size image. In this case, the flow proceeds to step S110 in which the x-coordinate and the y-coordinate of the outline coordinate data strings are transposed and the result of the transpostion is stored in the memory B111. If the transposition of the coordinates does not need to be performed, the read image is as it is stored in the memory B111.

In step S111, the outline coordinate data strings, which are stored in the memory B111, and the pixel density of each of which has been converted, are received by the binary image reproducing circuit 110, and a portion of the memory A103 is used to store the bit map image of the output image so as to draw the outline of the bit map image.

In step S112, image data, the outline of which has been drawn, is, for each raster, taken out from the memory A103, and the portion surrounded by the outline is drawn by the inside drawing circuit 104, and image data is transferred to the FIFO 105. At this time, outline coordinate data is again converted into binary raster image data. In the case where the flow proceeds from step S104 or step S105 to step S113, the binary raster image stored in the memory A103 is transferred to the FIFO 500 so as to be printed.

Binary raster image data transferred to the FIFO105 is again synchronized with the printer 106 in step S113 so as to be outputted from the printer 106 as a raster image.

Copying Process

The copying process will now be described with reference to a flow chart shown in in FIG. 4.

In step S201, an original document is read. In this case, the storage of the file does not need to be performed as is in the case of the immediately copying operation, the flow proceeds from step S202 to step S213 in which image data outputted from the image scanner 101 is transferred to the FIFO 105 via the memory A103 so as to be printed out. The reason why it is temporarily stored in the memory A103 lies in that the difference between the speed of the image scanner and that of the printer must be absorbed. If the recording speed can be changed as in the case of a thermal printer, image data is directly transferred to the FIFO 105 so as to be outputted as described above. If the immediately copying operation is performed, the reading resolution of the image scanner 101 is made to be the same as that of the output from the printer, resulting in that the necessity of performing a process to be eliminated and that a necessity lies in that the aforesaid transferring process is performed.

If an instruction is made to perform copying after image data has been stored as a file in place of the immediately copying operation, the flow proceeds to step S203 in which coding and compressing operation is performed in order to improve the efficiency of memorizing the image file. In this embodiment, the binary raster image stored in the memory A103 is transferred to the coding/decoding circuit 108 so as to be converted into an MH code or the like, so that it is transferred to and stored in the memory B111. The coding and compressing process may, of course, be performed by any of a variety of compression methods other than the MH coding method. A compressing method peculiar to the apparatus according to the present invention may be employed. Image data stored temporarily is again read out from the memory B111 at the time of the printing out operation as shown in steps S204 and S205, and is decoded by the coding/decoding circuit 108 so as to be developed in the memory A103 as binary raster image data.

In step S206, a discrimination is made as to whether or not the expansion/compression of the stored image file must be performed. The aforesaid discrimination is made on the basis of a fact that the size of the original document image is different from that of a recording medium of the apparatus or a fact that the expansion/compression is instructed by an operator. If the expansion/compression does not need to be performed, the flow proceeds to step S213 in which image data is, for each raster, transferred to the FIFO 105, is again synchronized with the printer 106 so as to be printed out. If the expansion/compression process is performed, the flow proceeds to step S207 in which, as described in the transmission process, a discrimination is made on the basis of the region discrimination table whether the stored image file is a pseudo half tone image or a character/line image. In step S215, if the image file is the pseudo half tone image, the decoded image is transferred to the raster image expansion/compression circuit 114 in which the expansion/compression is performed while maintaining the state of the binary raster image before it is returned to the bit map image memory of the memory A103. In step S215, if a discrimination is made in step S207 that the image is the character/line image, the flow proceeds to step S208 in which the blocks discriminated to be the character/line regions are sequentially transferred to the outline extraction circuit 107, so that binary raster image data is converted into the outline coordinate data strings which are stored in the memory B111 as the outline coordinate data strings. In the case where an enlargement process is, as described in the receiving process, performed in which image data stored with, for example, the G3 standard resolution (main scanning: 8 pel/mm, sub-scanning: 3.85 pel/mm) is outputted to a printer, the resolution of which is 400 dpi, the first and second smoothing processes to be described later are performed in the smoothing/coordinate-conversion circuit in order to perform the smoothing process in step S214.

In step S210, each coordinate of the outline coordinate data strings or the smoothed outline coordinate data strings is multiplied by the ratio of expansion/compression so as to be converted into the outline coordinate data adaptable to the resolution and the size of the printed-out image. In step S211, image data converted into the outline coordinate data strings of the printed-out image is transferred to the binary image reproducing circuit 110, so that the outline is drawn in the bit map image memory of the memory A103 by the binary image reproducing circuit 110. In step S212, binary raster image data, which has been formed in the memory A103, and the outline of which has been drawn, is, for each raster, read out so as to be transferred to the FIFO 105 in which it is synchronized with the printer as shown in step S213 so as to be printed out.

Although the aforesaid processes are described sequentially, the decoding process, the outline extraction process, the smoothing process, the coordinate conversion process, the binary image reproducing process and the inside drawing process can be performed in parallel by performing each process for each block, resulting in the through-put of the system to be improved. Among the processes according to his embodiment, a process, which causes a large load to be borne, may be performed during waiting in place of performing it at the time of the transmission and receiving processes.

Each of Processing Circuits

In order to describe the resolution conversion in each processing blocks by using the outline coordinate strings, the outline extraction circuit 107, the smoothing/coordinate-conversion circuit 109, the binary image reproducing circuit 110 and the inside drawing circuit 104 will now be described with reference to the drawings.

Outline Extraction Circuit

Figure 6:
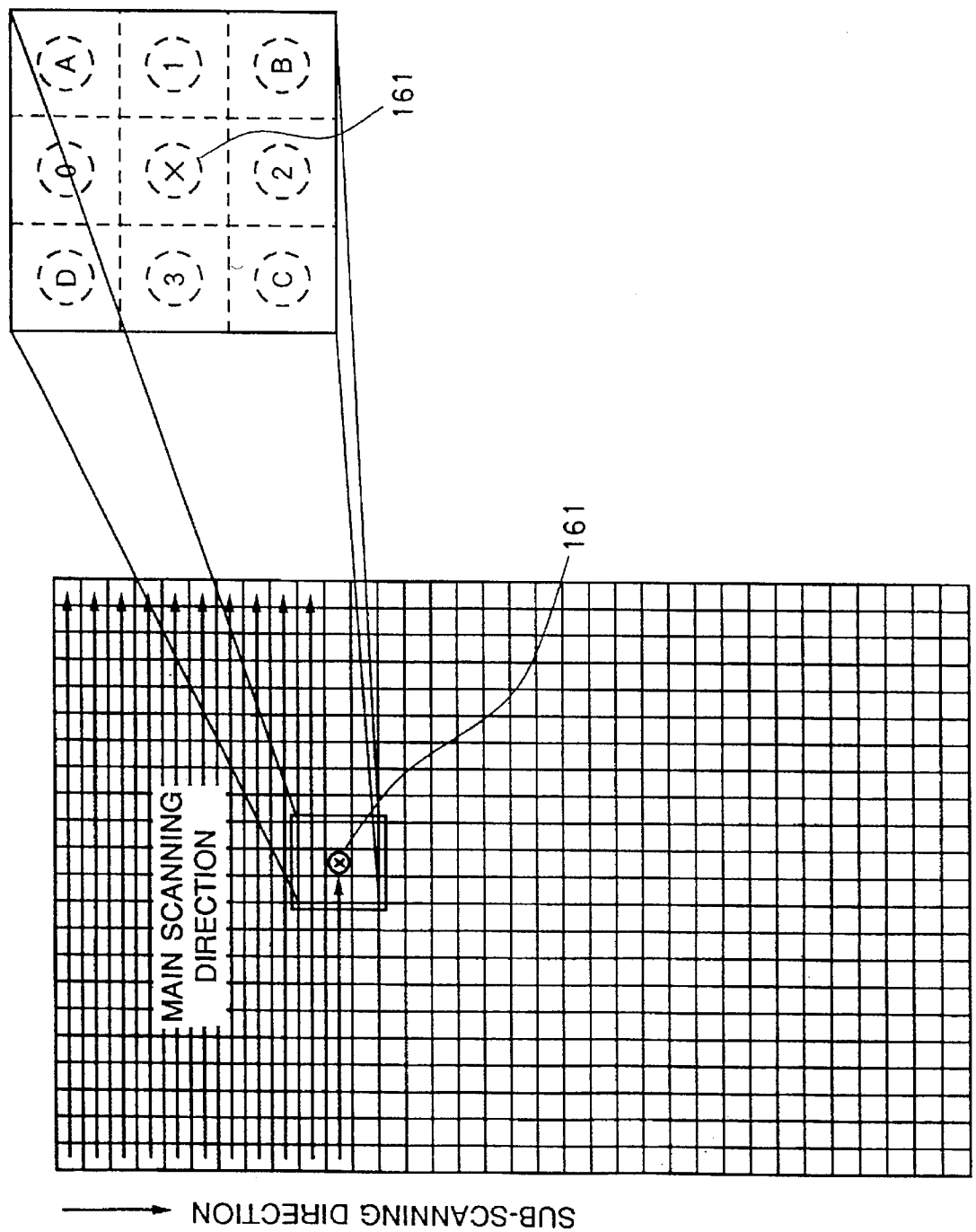
FIG. 6 illustrates the unit of contour vector extraction in the first embodiment.

The outline extraction circuit 107 performs the process while observing a subject pixel 161 and adjacent 8 pixels (A, B, C, D, 0, 1, 2, and 3) of the binary image as shown in FIG. 6. The subject pixel is sequentially shifted by one pixel so as to process all of the rasters, so that the overall image is processed. The specific operation is performed as follows. The outline extraction process according to this embodiment is performed in such a way that a black region is positioned to the right in the direction of a vector to be extracted.

The start point and the end point of a rough outline vector to be extracted are, in both the main scanning direction and the sub-scanning direction, positioned at an intermediate position between two pixels. Furthermore, the central position at which the pixel is present is expressed by a plus integer in both the main scanning direction and the sub-scanning direction and the position of the pixel is expressed by two-dimensional coordinates. In the case where the position of a subject pixel of an image having a size of 1728 pixels in the main scanning direction and 2287 pixels in the sub-scanning direction is [3, 7](it is meant a third pixel in the seventh raster), the rough outline vector coordinate strings surrounding the subject pixel are (2.5, 6.5), (3.5, 6.5), (3.5, 7.5), and (2.5, 7.5) when viewed clockwise. That is, they are the coordinate positions of the four corners while assuming that the subject pixel is in the form of a rectangular. It should be noted that the rough outline vectors are, while assuming that the aforesaid four points are a, b, c and d and expressing a vector by a form of x→y, a→b, b→c, c→d, and d→a.

Figure 5:
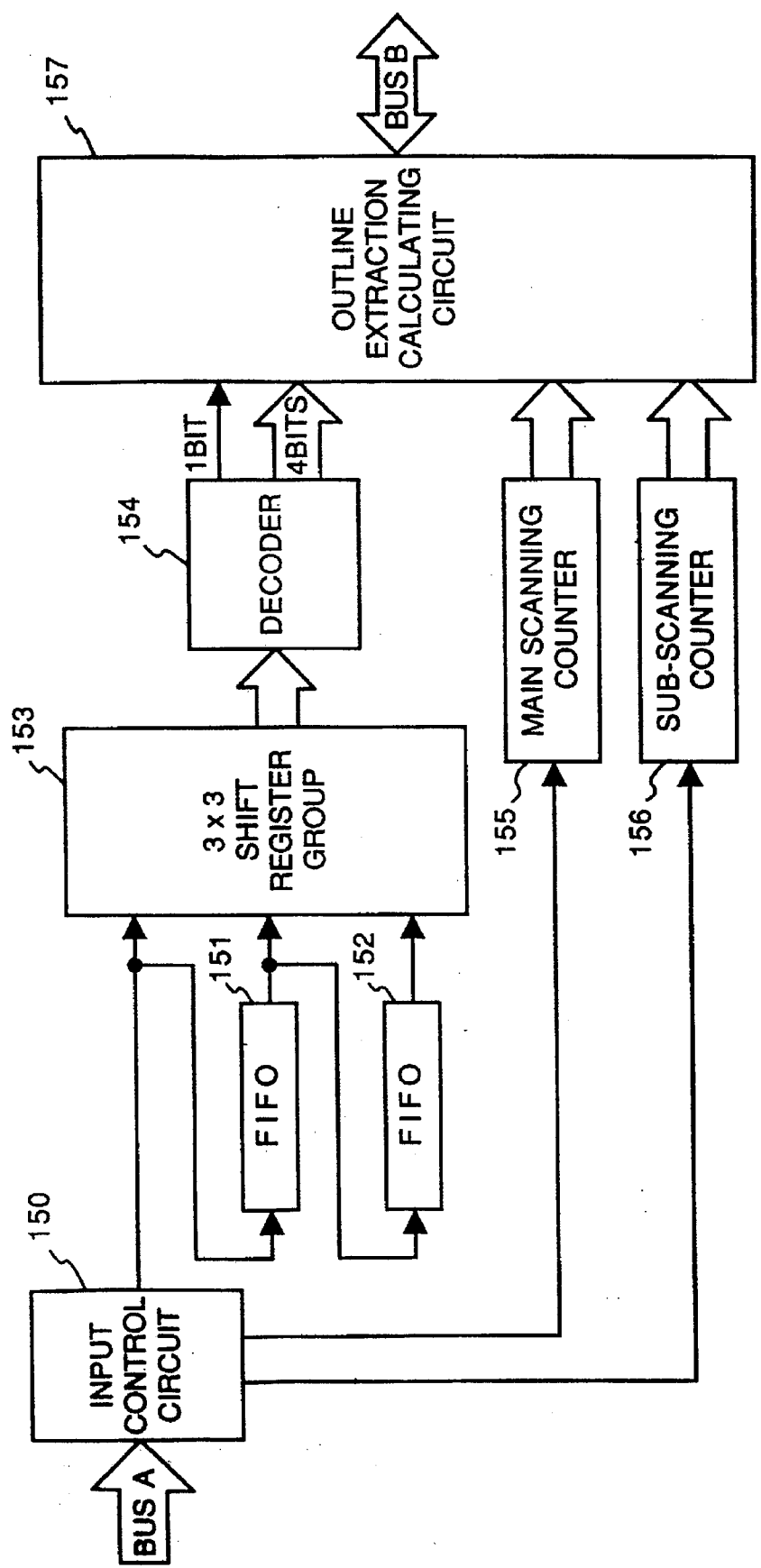
FIG. 5 is a block diagram of a contour extraction circuit of the first embodiment.

FIG. 5 is a block diagram which illustrates the internal structure of the outline extraction circuit 107. Reference numeral 150 denotes an input control circuit which receives binary raster image data stored in the memory A103 and which outputs it as serial data. It should be noted that the aforesaid data is synchronized with a horizontal and vertical synchronizing signals (omitted from illustration) and is outputted as serial data. Reference numerals 151 and 152 denote FIFO memories for taking out pixel data for three lines in the vertical direction, the FIFO memories 151 and 152 delaying pixel data, supplied while being formed into serial data, by a degree of one line. Reference numeral 153 denotes a 3×3 shift register group which receives an output from the input control circuit 105, an output from the FIFO 151 which is delayed by a degree of one line, and an output from the FIFO 152 which is delayed by a degree of two lines, so as to sequentially receives data for three lines. The received binary image data for three lines is sequentially shifted by one pixel so as to transmit (9-bit) data of 3×3 pixels as shown in FIG. 6 to a decoder 154. The decoder 154 outputs 4-bit numerical data which shows the state of the surrounding 8 pixel except for the subject pixel (x shown in FIG. 6) and the value of the subject pixel to an outline extraction computing circuit 157. The state of the 8 pixels used hereinbefore is information showing the state of the subject pixel, for example, whether or not the subject pixel is positioned on the edge of a binary image. If the subject pixel is positioned on the edge, the aforesaid information shows the direction of a white region (binary data is "0") among the four directions.

Reference numeral 155 denotes a main scanning counter for outputting the position of the subject pixel in the main scanning direction to the outline extraction computing circuit 157. Reference numeral 156 denotes a sub-scanning counter for outputting the position of the subject pixel in the sub-scanning direction to the outline extraction computing circuit 157.

The outline extraction computing circuit 157 extracts the rough outline vector from the output value from the decoder 154 so as to make and update a table containing the coordinates of the starting point of each rough outline vector and item No. information of another rough outline vector flowing in the aforesaid rough outline vector (the end point of which is the start point of the aforesaid vector) and another rough outline vector (the starting point of which is the end point of the aforesaid vector) flowing out from the aforesaid rough outline vector.

The aforesaid rough outline vector will now be described.

In the first embodiment, a vector along the edge of the binary image is extracted. In the case where the vector is extracted while considering the pixel level, there are two types of the vectors, that is, vertical directional vectors and horizontal directional vectors. In other words, the edge of the binary image is an aggregation of a vertical directional vector and a horizontal directional vector. When a certain vertical vector is paid attention although the vector size is varied, a horizontal vector is, without exception, connected to both of the starting point and the end point of the subject vertical vector. That is, a vertical vector is held between horizontal vectors. On the contrary, a horizontal vector is held between vertical vectors. When a certain vector is paid attention, a vector which is connected to the starting point of the subject vector, that is, a vector, the end point of which is the starting point of the subject vector, is called an inflow vector in this embodiment, while a vector, the starting point of which is the end point of the subject vector, is called an outflow vector. By obtaining the relationship of the connection between the vectors, the outline along the edge of the subject binary image can be specified. Each vector is given unique No. so as to specify the vector, and the aforesaid No. shows the relationship of the connection between vectors. The No. which specifies each vector, is called "Item No." hereinafter.

Figure 7:
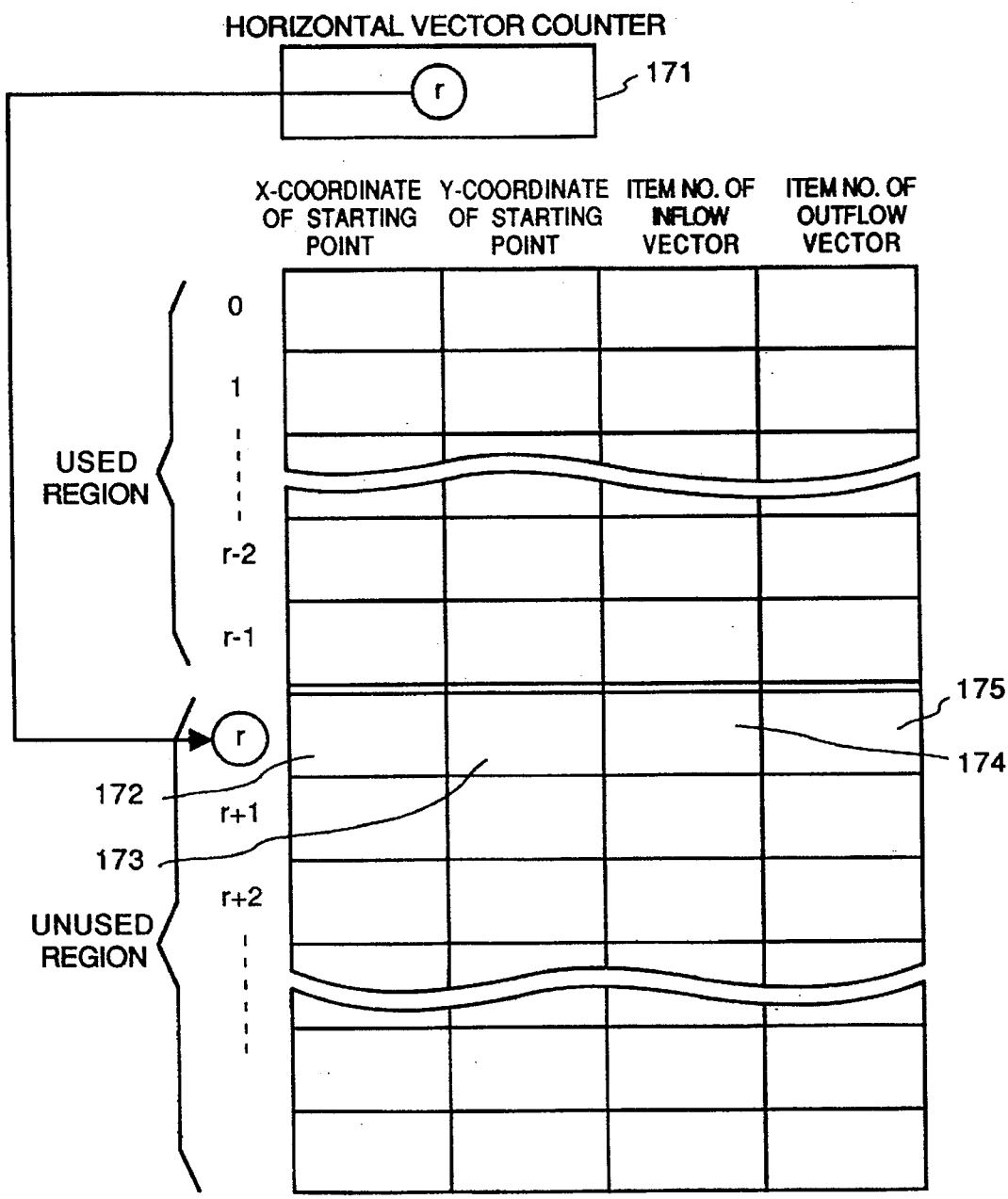
FIG. 7 shows a horizontal rough contour vector table in the first embodiment.
Figure 8:
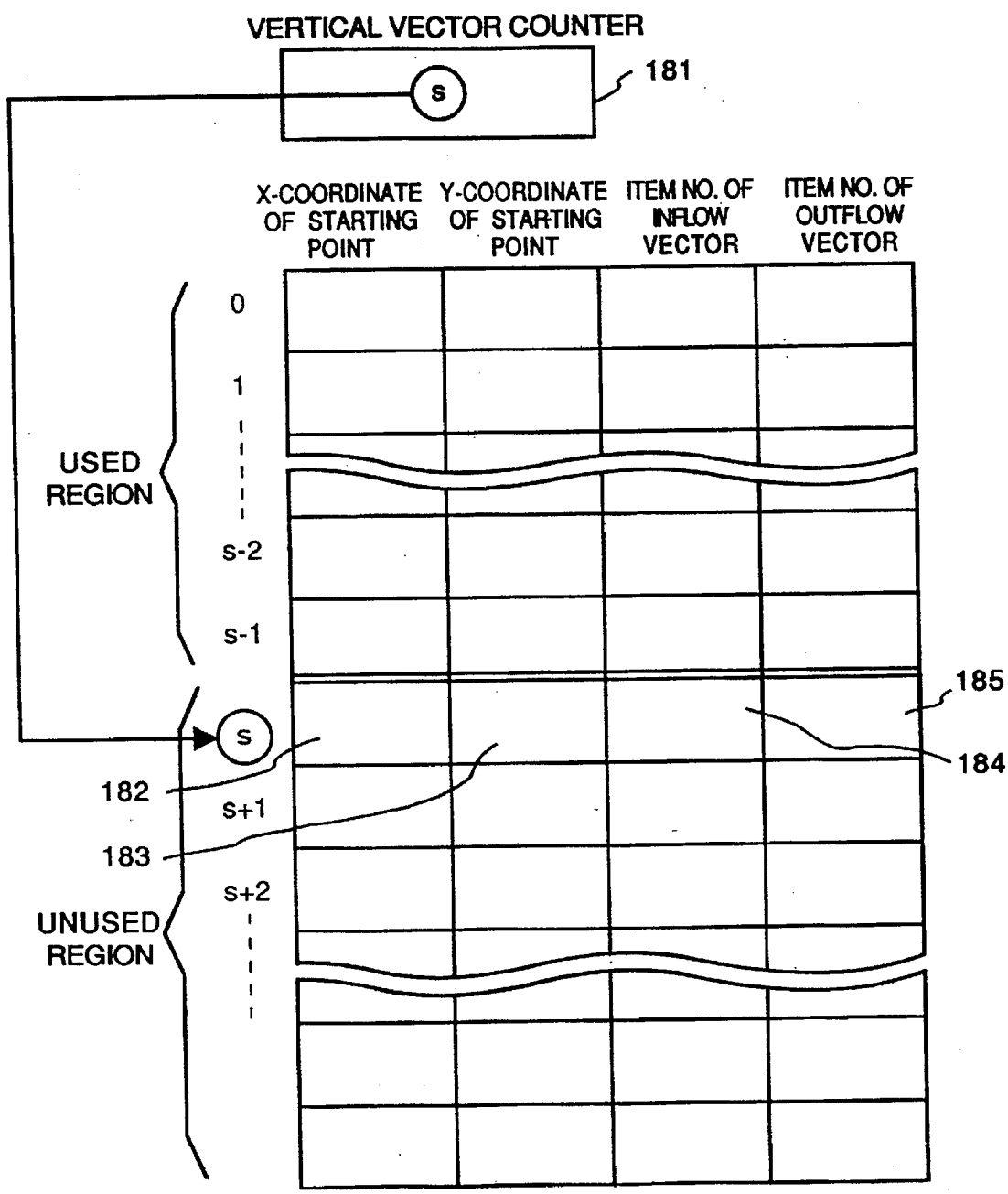
FIG. 8 shows a vertical rough contour vector table in the first embodiment.

FIG. 7 illustrates the horizontal directional rough outline vector and FIG. 8 illustrates the vertical directional rough outline vector, which are, in the form of tables, stored in the memory B111.

Referring to FIGS. 7 and 8, reference numeral 171 denotes a counter which shows the item No. of the horizontal directional rough outline vector and the count of which is increased by one when the horizontal rough outline vector increases by one (newly found). Reference numeral 172 denotes a region for use to record the x-coordinate of the starting point of the horizontal directional rough outline vector. Reference numeral 173 denotes a region for use to record the y-coordinate of the starting point of the horizontal directional rough outline vector. Reference numeral 174 denotes a region for storing the item No. of the vertical vector (outflow vector) to be connected to the starting point of the aforesaid horizontal vector. Reference numeral 175 denotes a region for storing the item No. of the vertical vector (outflow vector) to which the end point of the aforesaid horizontal vector is connected. Since the two vectors connected to the horizontal vector are vertical vectors as described above, the regions 174 and 175 store the item No. of each vertical vector to be connected to the horizontal vector.

The aforesaid idea is similarly adapted to the table for the vertical vectors shown in FIG. 8. That is, reference numeral 181 denotes a counter which shows the item No. of the vertical directional rough outline vector and the count of which is increased by one when the vertical rough outline vector increases by one. Reference numeral 182 denotes a region for use to record the x-coordinate of the starting point of the vertical directional rough outline vector. Reference numeral 183 denotes a region for use to record the y-coordinate of the starting point of the vertical directional rough outline vector. Reference numeral 184 denotes a region for storing the item No. of the horizontal vector (inflow vector) to be connected to the starting point of the aforesaid vertical vector. Reference numeral 185 denotes a region for storing the item No. of the horizontal vector (outflow vector) to which the end point of the aforesaid vertical vector is connected.

The rough outline vector is, upon occasion, added to the aforesaid horizontal and vertical directional rough outline vector tables, and the contents of the same are updated whenever one pixel is processed, so as to be completed as the horizontal and vertical directional rough outline vector tables for an image of one frame after the process of one frame has been completed.

Figure 9:
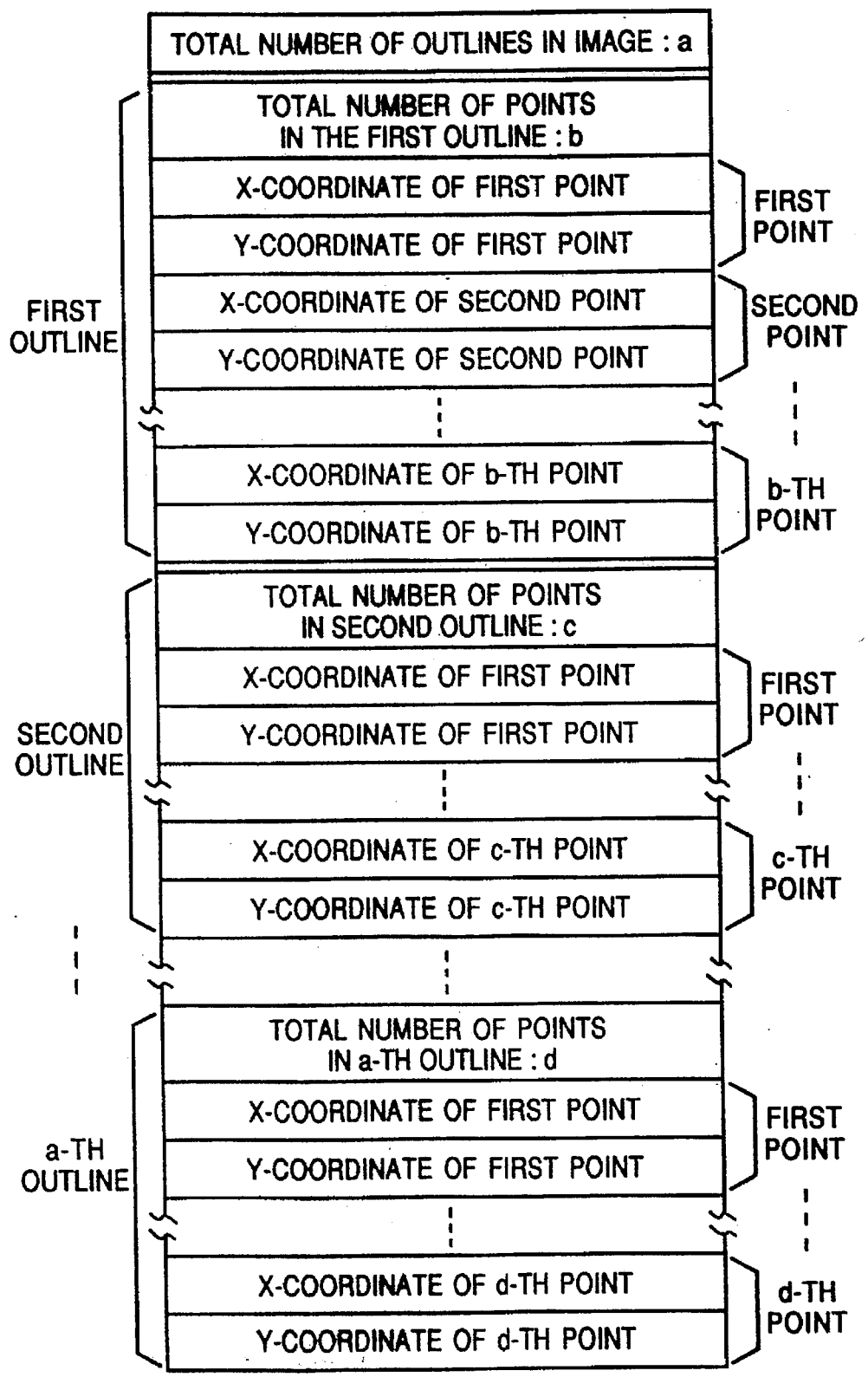
FIG. 9 shows an example of a vector table in the first embodiment.

By sequentially checking the item Nos. of the inflow vector and two output vectors of the horizontal and vertical directional rough outline vector tables shown in FIGS. 7 and 8, a table of a rough outline vector coordinate as shown in FIG. 9 is made which expresses the total number of the outlines, the total number of the outlines for each outline (closed loop of the outline, and the x- and y- coordinates of each point included by the outline. Thus, a series of the processes is completed here.

If a discrimination is made that the subject pixel is not positioned at the edge of the image, the arrangement may be made in such a way that the addition and updating processes are not performed in the aforesaid state because the table is not substantially updated, resulting in the processing speed to be raised.

Figure 23:
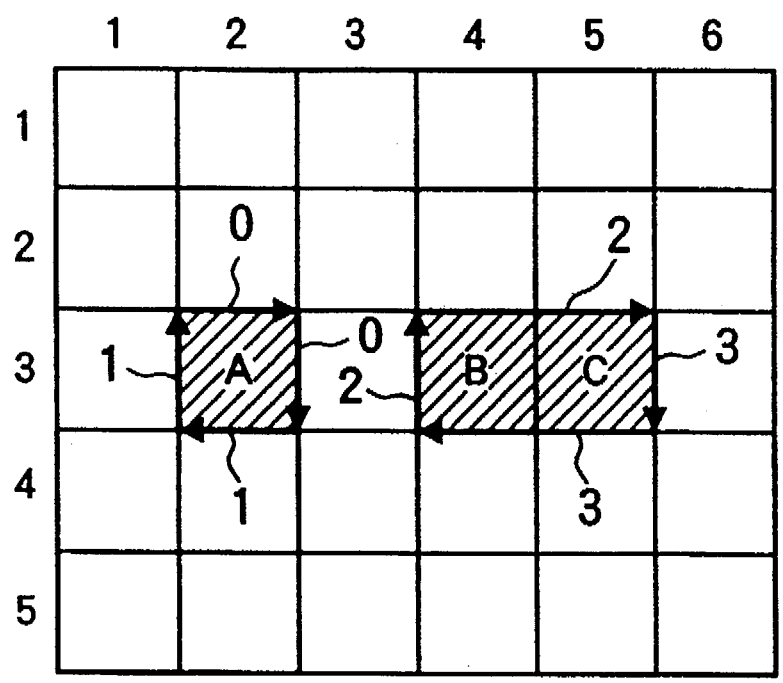
FIG. 23 shows an example of an input image which is used to illustrate the contour vector extraction principle in the first embodiment.

The processing and updating processes of the horizontal and vertical directional rough outline vector tables will now be specifically described. In order to simplify the description, assumptions are made that the read image has a size of 6×5 pixels and that a single pixel A and continued pixels B and C present as shown in FIG. 23. The coordinate positions (the rough outline vector coordinates) of the four corners of the pixel A are (2.5, 2.5), (2.5, 3.5), (1.5, 3.5), and (1.5, 2.5) when viewed clockwise from the upper right position. The coordinate positions of the pixels B and C need no explanation.

Reading and processing the aforesaid image, a first black pixel is detected on the third raster at the second pixel. At this time, all of the pixels surrounding the subject pixel (pixel A) are white ("0") pixels and, therefore, four vectors are present in such a way that two vectors are present in the horizontal direction and two vectors are present in the vertical direction. Since this embodiment is arranged in such a manner that the item No. is given to a new rough outline vector whenever it is generated, item Nos. 0 and 1 are given in both the horizontal and vertical directions in this case. Therefore, the horizontal and vertical vector tables are as shown in FIG. 24A. The way of use of the aforesaid tables will now be again described.

For example, an attention is paid to a horizontal vector which is given item No. "0" A vertical vector, the item No. of which is "1", flows in the starting point (the upper left corner of the pixel A) of the subject vector, while a vertical vector, the item No. of which is "0", flows out from the end point of the subject pixel. Incidentally, the item No. of each vector may be considered to be an offset address which shows the position in the table at which the vector is stored. That is, it can be understood that data of the vertical vector, which flows in/flows out to and from the horizontal vector, the item No. of which is "0", is present at offsets "0" and "1" of the vertical vector table.

Referring back to FIG. 23, the process is shifted from the pixel A to the right pixel, resulting in that no process is performed and the process proceeds to the next pixel B because the subject pixel is white.

If an attention is paid to the pixel B, it can be understood that vectors are present in the upward and downward direction and on the right of the subject pixel except for the right of the same. Furthermore, the coordinate positions of the upper left corner of the subject pixel can be defined to be the starting point of the horizontal vector and those of the lower left corner of the subject pixel can be defined to be the starting point of the vertical vector. Hence, the aforesaid points can be newly registered into the horizontal and vertical vector tables. However, coordinates (3.5, 2.5) of the upper left corner of the subject pixel is stored as the starting point of a horizontal vector, the item No. of which is "2", and coordinates (3.5, 3.5) of the lower left corner is stored as the starting point of a vertical vector, the item No. of which is "2" because item No. "1" or less are used in both of the vertical and horizontal directions. If an attention is paid to a horizontal vector the item No. of which is "2", a vertical vector, the item No. of which is "2", flows in the aforesaid horizontal vector. Since a vertical vector cannot be discriminated at this point (a pixel continued in the horizontal direction is present), a mark is given so as to be distinguished. The aforesaid operation must be similarly performed when the vertical vector, the item No. of which is "2" is treated. That is, a mark is given to a corresponding position in the table because a horizontal vector which flows in the vertical vector, the item No. of which is "2", cannot be discriminated. Thus, each table is updated as shown in FIG. 24B.

When the process proceeds to pixel C, coordinate positions (5.5, 3.5) and (5.5, 2.5), which are the start points of vectors, are generated. Therefore, the table is updated by the aforesaid coordinate positions. Since the vertical vector, which flows out from the horizontal vector, the item No. of which is "2", is a vertical vector which has been newly registered and the item No. of which is "3", the item No. of this vertical vector is written on the horizontal vector. Similarly, the vertical vector is subjected to the updating process. Thus, each table is updated as shown in FIG. 24C. After all of the horizontal and vertical vectors of the rough outline vector and their connection relationship have been extracted, a vector table as shown in FIG. 9 is made on the basis of the aforesaid vector tables.

Figures 21, 22:
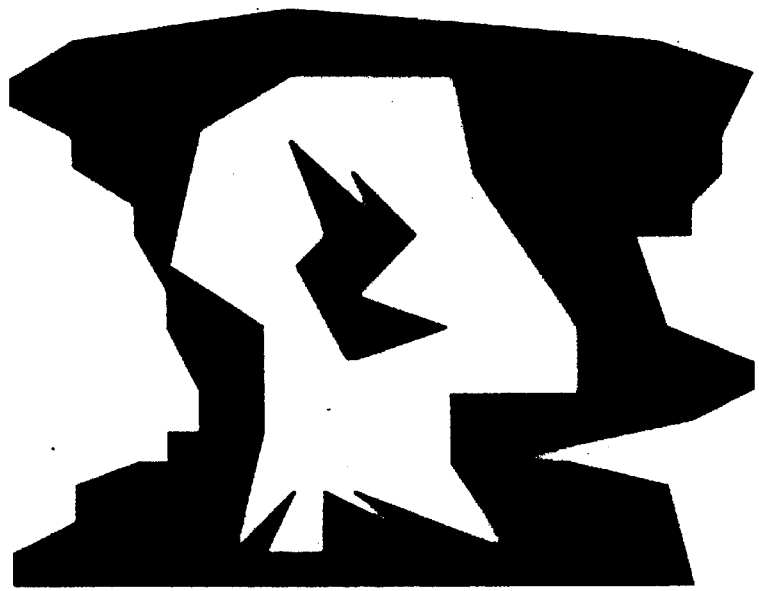
FIG. 21 shows an example of an input image.
FIG. 22 shows outline vector data which is based on the image of FIG. 21.

FIG. 21 illustrates an example of an input image, and FIG. 22 illustrates the vector table obtained from the input image.

Smoothing/Coordinate-Conversion Circuit

Figure 10:
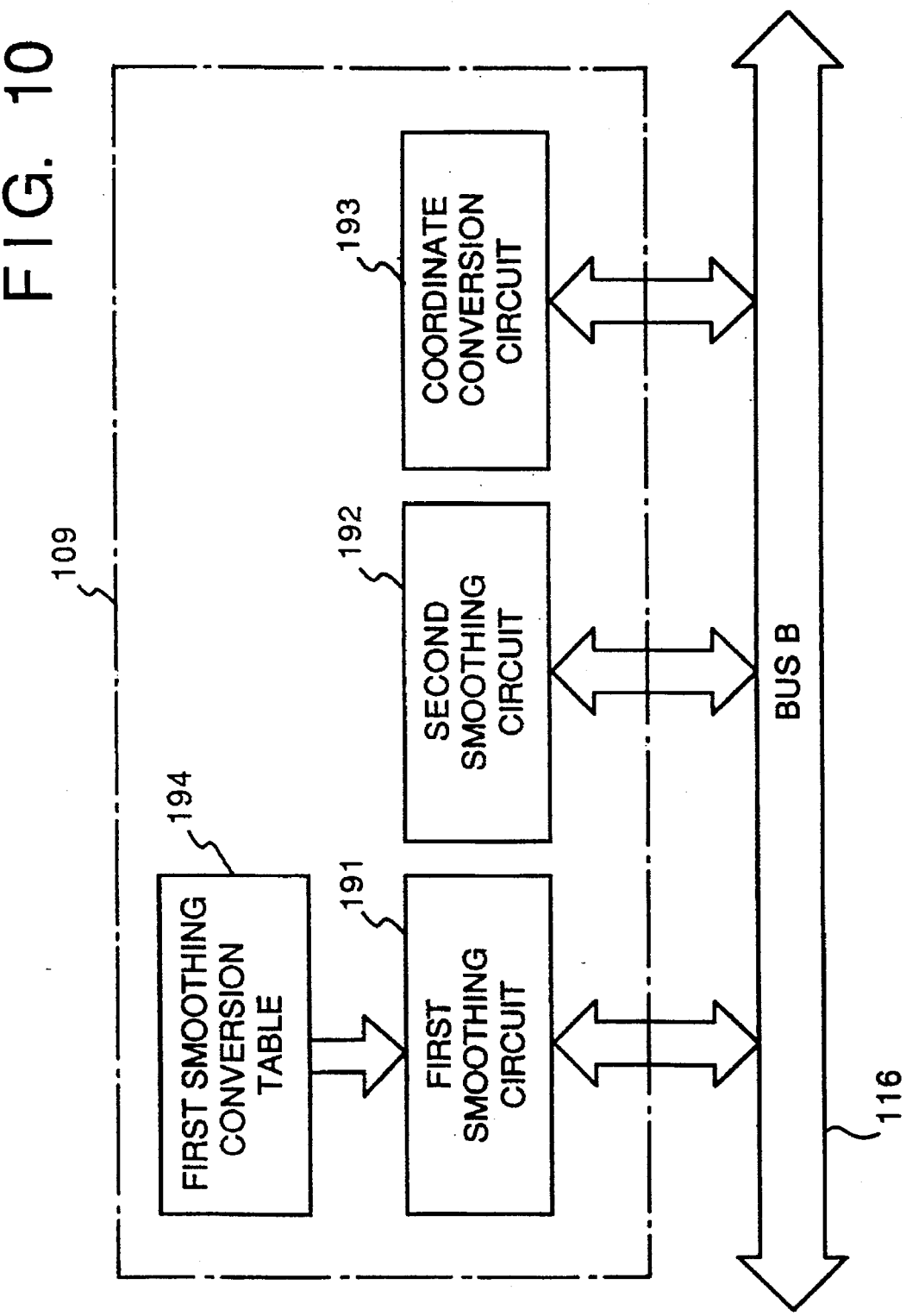
FIG. 10 is a block diagram of a smoothing/coordinate transformation circuit 109 in the first embodiment.

The smoothing/coordinate-conversion circuit 109 according to this embodiment will now be described. As shown in FIG. 10, the smoothing/coordinate-conversion circuit 109 according to this embodiment comprises a first smoothing circuit 191, a first smoothing conversion table 194, a second smoothing circuit 192 and a coordinate conversion circuit 193.

The first smoothing circuit 191 receives the rough outline data strings, as shown in FIG. 9, converted from the raster scanning type binary image by the outline extracting circuit 107 so as to convert the outline coordinate data strings and to label the corner point in accordance with the state of the connection of the vectors while referring to the first smoothing and conversion table 194 in such a manner that the coordinate strings are traced for each closed vector region, so that information about apex coordinate data strings and information showing whether or not each apex is a corner point after the first smoothing operation has been performed are outputted. In the second smoothing circuit 192, the weighted mean of the coordinate values of a plurality of points in front and in the rear of the subject point is obtained on the basis of the information about the first-smoothed apex coordinate data strings and information about the corner point so as to output the outline vector coordinate data strings. In the coordinate conversion circuit 193, the coordinate values of the x-axis and y-axis are transposed and each coordinate value is multiplied by the ratio of expansion/compression. If a contraction process is performed, the smoothing process to be performed by the first smoothing circuits 191 and 192 are bypassed and data is directly supplied to the coordinate conversion circuit 193.

Figure 11:
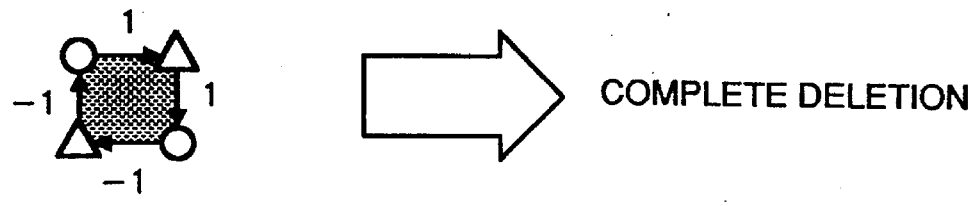
FIG. 11 shows an example of a processing of a first smoothing circuit in the first embodiment.

The aforesaid process will now be described. In the first smoothing circuit 191, references are made to the patterns of 7 vectors including at most three sides in front and in the rear of the subject pixel as shown in FIGS. 11 to 18 so as to make a reference to the pattern of the direction and the length of each side, so that the rough outline coordinate value data strings are removed and/or converted. "N-pnt" shown in FIG. 11 and so forth is the total number of closed loops of rough outline coordinate value data, a single circle denotes the starting point of the horizontal vector and the end point of the vertical vector, a triangle denotes the end point of the horizontal vector and the starting point of the vertical vector, and a double circle denotes the corner point. The first smoothing operation includes, as the subject, a pattern shown in FIG. 11 and arranged to remove noise (notch/isolated point) peculiar to the binary image. That is, in an isolated pixel removal of one pixel size, all of the coordinate values of the pixel are deleted as shown in FIG. 11. As a result, the problem that the pixel is undesirably highlighted at the time of enlarging the image can be prevented. If the white region present in a black region is maintained, all of the outline coordinate are given corner point label at the time of outputting while maintaining the coordinate value. The term "corner point" used hereinbefore is meant a portion, the coordinate position is not moved even it has been subjected to the second smoothing process to be Described later. Although the description order is inverted, the left and upward directions are respectively made to be minus directions in this embodiment because the directions X and Y are made to be right and downward directions. Furthermore, a fact that "≦-3" shows that at least three pixels are continued in the minus direction.

Figure 12:
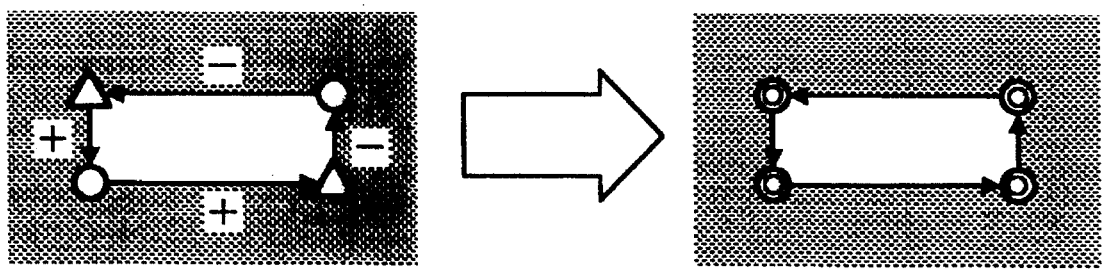
FIG. 12 shows another example of a processing of the first smoothing circuit in the first embodiment.

FIGS. 11 and 12 illustrate the aforesaid facts, and then the description will be continued with reference to on and after FIG. 13.

Figure 13A:
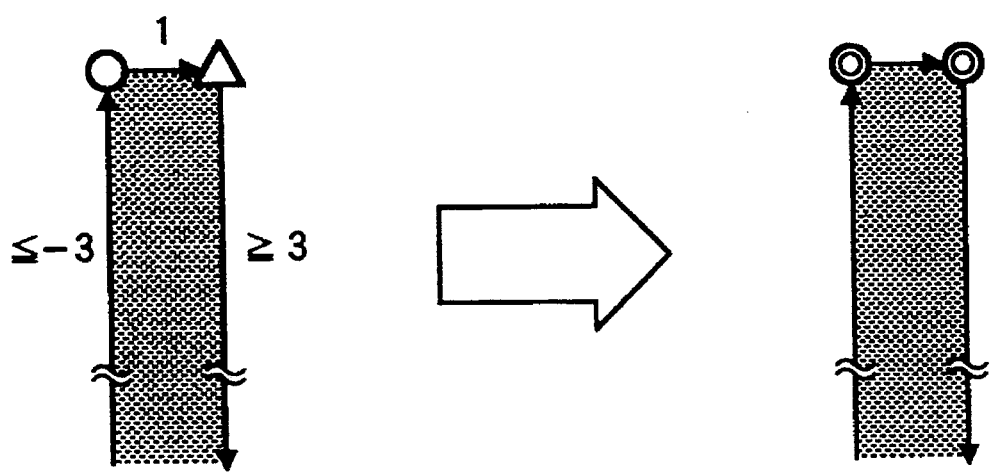
FIGS. 13A and 13B show another example of a processing of the first smoothing circuit in the first embodiment.
Figure 13B:
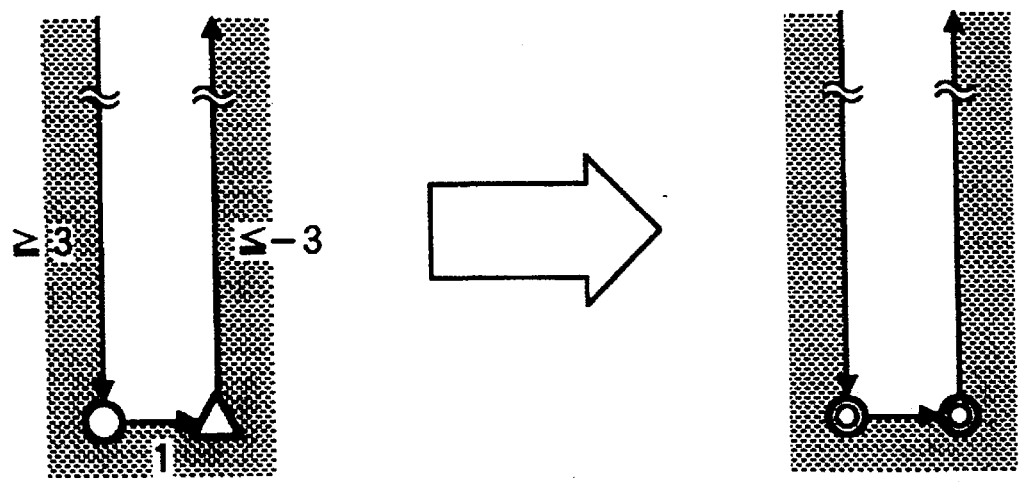

FIGS. 13A and 13B illustrate an arrangement made that the coordinate position showing an end portion of a thin line having a length corresponding at least three pixels is defined to be a corner point and change of its coordinate position is inhibited in the second smoothing process to be described later. In other words, rounding of the corner point is inhibited. It will be further described so as to be easily understood, a line segment having a width of one pixel and a length of 3 pixels or more and present in the background is recognized to be a portion of a character or a line picture or the like in place of being recognized to be so-called "dust" contained in the read image. Although the length is arranged to be three pixels or more in this embodiment, it may be a length of two pixels if the reading resolution is unsatisfactory because the length must be determined depending upon the reading resolution. If the image is read with a further excellent resolution, the length may be four or more pixels. The aforesaid fact is also applied to the descriptions to be made hereinafter.

Figure 14A:
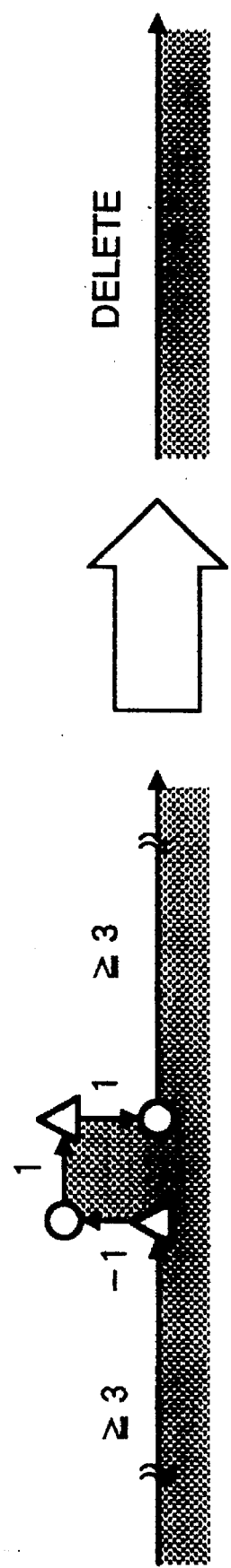
FIGS. 14A and 14B show another example of a processing of the first smoothing circuit in the first embodiment.
Figure 14B:
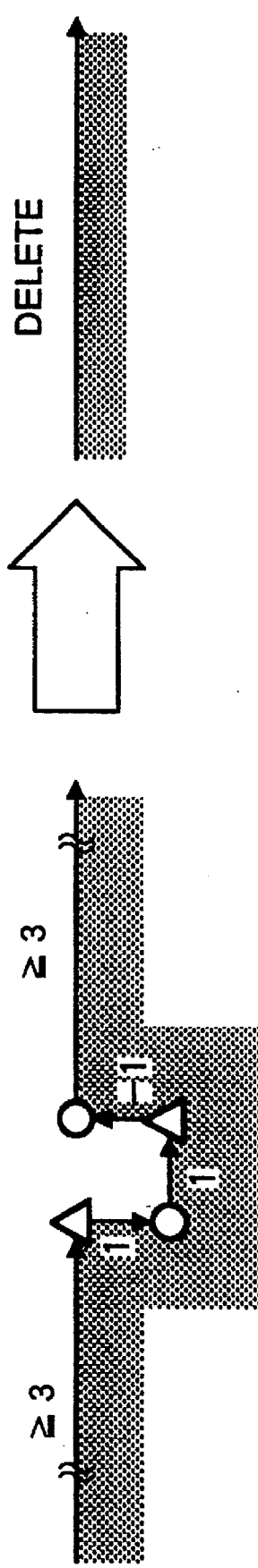

FIGS. 14A and 14B illustrate an operation in which projections and pits of a size corresponding to one pixel in a flat state for a predetermined length (three pixels in this embodiment) are deleted, that is rough outline vector data of the projections and pits are deleted. FIG. 15 illustrates an operation in which, if projections and pits are continuously present, the projections and pits are flattened.

Figure 16A:
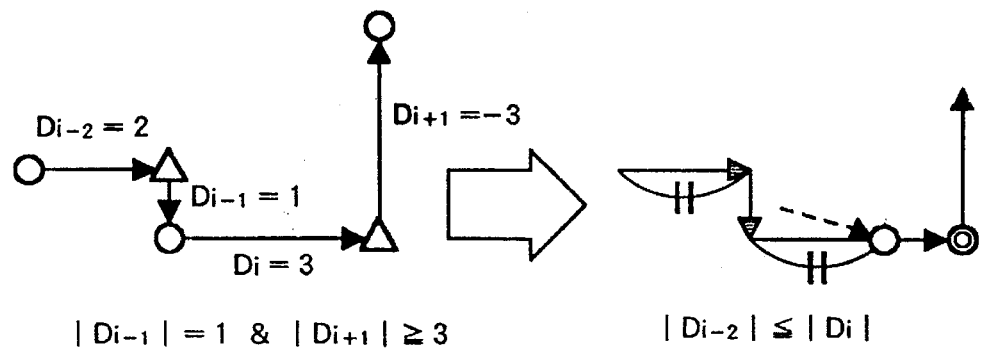
FIGS. 16A through 16C show another example of a processing of the first smoothing circuit in the first embodiment.
Figure 16B:
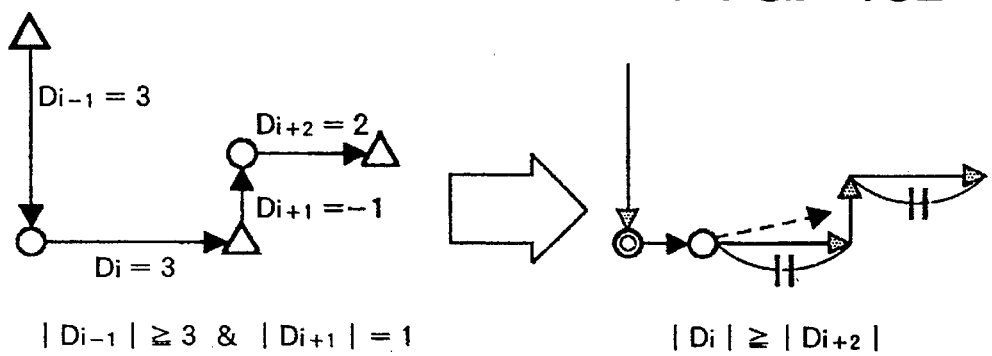
Figure 16C:
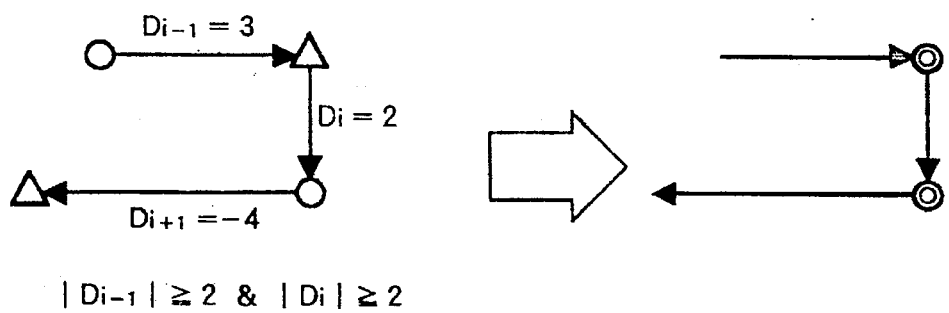

FIGS. 16A to 16C illustrate the definition of the corner point and a concept of smoothing of the vector. Referring to FIGS. 16A to 16C, symbol "$D_i$" denotes the subject rough outline vector. In the case of FIG. 16A for example, the end point of the subject rough outline vector is made to be the corner point if the end point of the subject rough outline vector is positioned as illustrated. Furthermore, vector $D_{i-1}$ present immediately in front of the subject vector $D_i$ is deleted, and the length, which is the same as vector $D_{i-2}$ positioned secondarily in the forward direction is started from the starting point of the subject vector, and vector which connects the end position and the starting position of the vector $D_{i-2}$ is updated as vector $D_{i-2}$. In addition, a vector expressed by the end point of the updated vector $D_{i-2}$ and the corner point is updated as the subject vector.

Figure 17A:
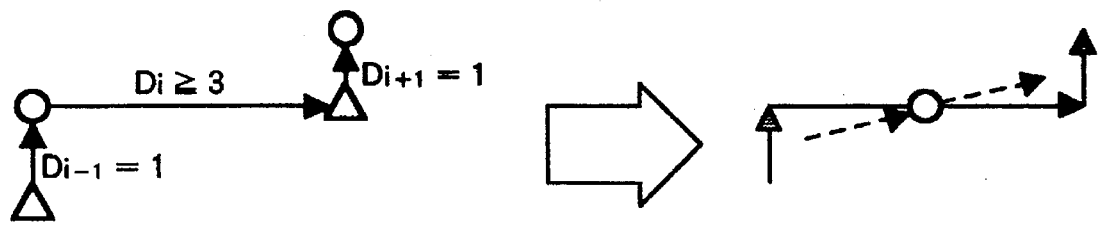
FIGS. 17A and 17B show another example of a processing of the first smoothing circuit in the first embodiment.
Figure 17B:
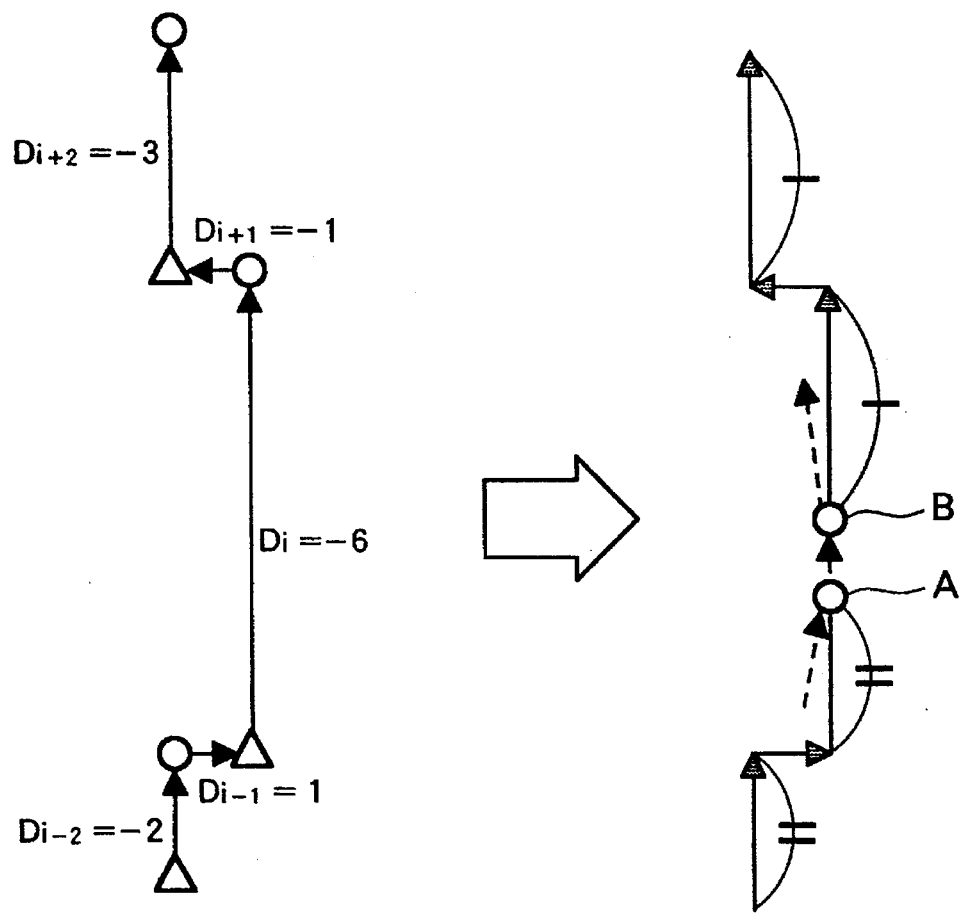
Figure 18A:
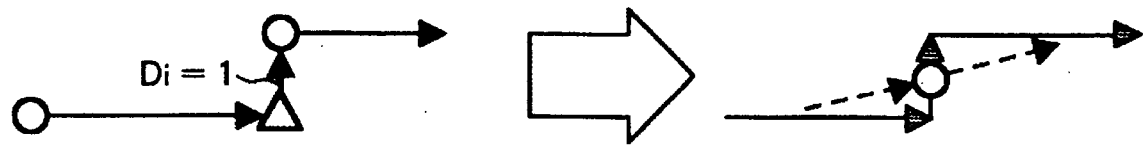
FIGS. 18A through 18C show another example of a processing of the first smoothing circuit in the first embodiment.
Figure 18B:
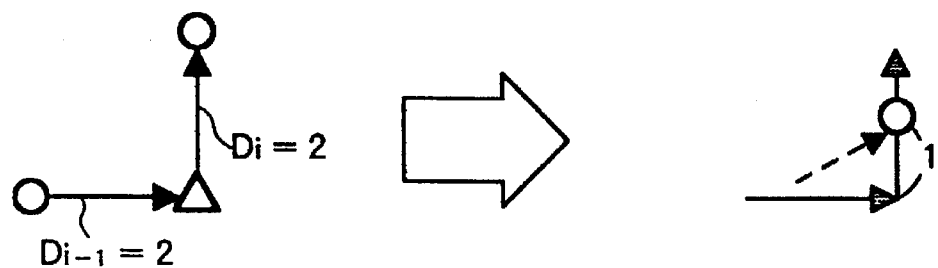
Figure 18C:
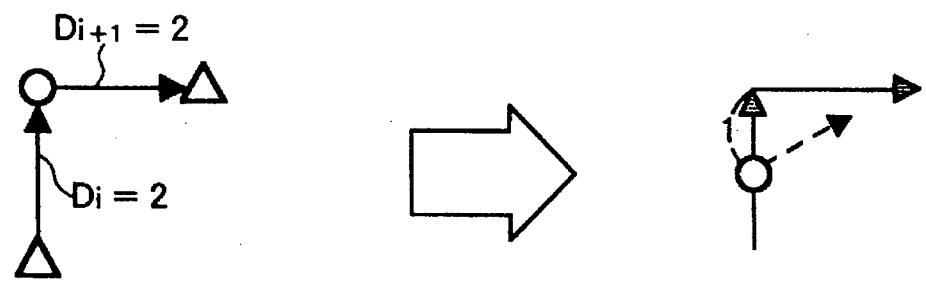

FIGS. 17A and 17B illustrate a process of smoothing a moderate diagonal line portion. An edge inclined in a predetermined direction in such a way, for example, that it rises by one pixel and extends in the horizontal direction by 3 pixels or more, and then it again rises by one pixel as shown in FIG. 17A is made in such a manner that the middle point of the subject vector is made to be the end point of the immediately front vector $D_{i-1}$ and the starting point of the immediately rear vector $D_{i+1}$. If the edge is inclined upwards and then it is inclined downwards at an intermediate position thereof, the aforesaid process is not performed. It can be discriminated by multiplying the inclination of the immediately front vector and that of the immediately rear vector so as to examine the sign. FIG. 17B illustrates an example in which five vectors are finally made to be three vectors. That is, in the conditions as illustrated, the immediately front and rear vectors of the subject vector $D_i$ are deleted, and a vector which connects the starting position of vector $D_{i-2}$, which has not been smoothed yet, and point A on the subject vector $D_i$ is made to be vector $D_{i-2}$, a vector expressed by points A and B is made to be the subject vector $D_i$, and a vector expressed by the point A and the end point of the vector $D_{i+2}$, which has not been smoothed yet, is made to be vector $D_{i+2}$. In the case shown in FIGS. 18A to 18C, processes as illustrated are performed. In an example shown in FIG. 18A, the intermediate position of the subject vector $D_i$ is made to be the end point of the immediately front vector and the starting point of the immediately rear vector.

As the result of the aforesaid process performed by the first smoothing circuit 191, the rough outline vector constituted by only the vertical and horizontal vectors is allowed to have a diagonal vector.

Figure 19:
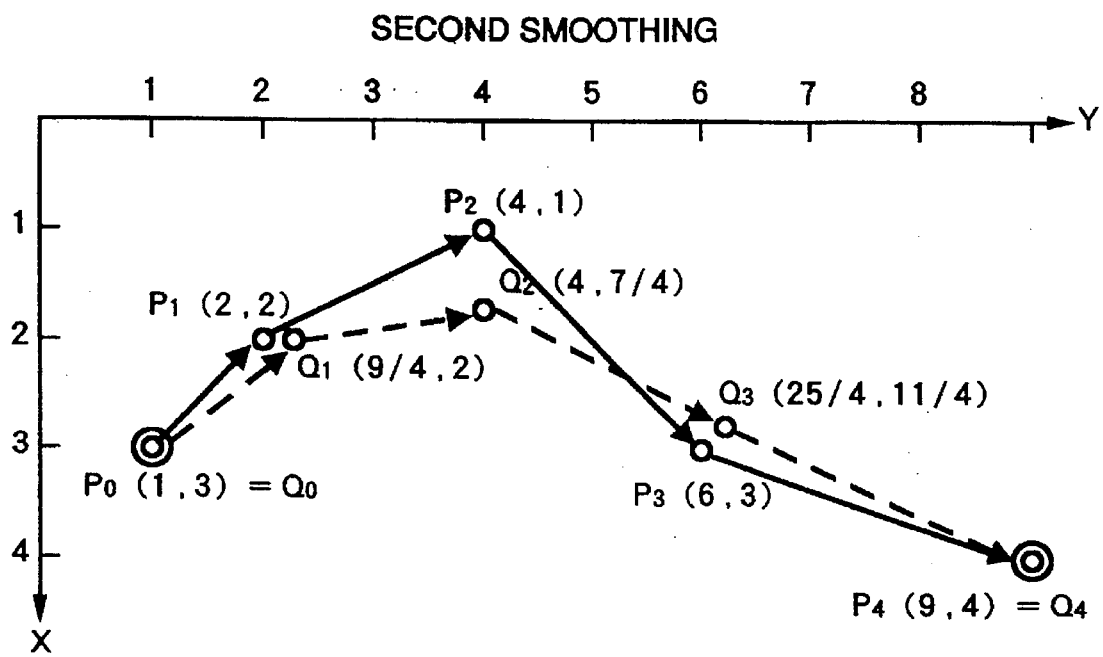
FIG. 19 shows another example of a processing of the first smoothing circuit in the first embodiment.

In the second smoothing circuit 192, the corner points marked by double circles shown in FIG. 19 are maintained, and the mean weight of the coordinate values (the coordinate values of the front and rear points in this embodiment) of a plurality of front and rear points positioned across the subject point of each coordinate point other than the corner point is obtained, and the each mean average is outputted as apex coordinate data strings, which has been subjected to the second smoothing process. Point $Q_i$ shown in FIG. 19 denotes the apex coordinate data strings, which has been subjected to the second smoothing process, and point Pi denotes an apex coordinate data, which has been subjected to the first smoothing process. In the illustrated example, Q1 is obtained from the mean average of $P_0$ (1, 3), $P_1$ (2, 2) and $P_2$ (4, 1). The effective number of digits for use in the first and the second smoothing processes is arbitrarily determined so far as it is in a range which is effective to the recording resolution.

In the coordinate conversion circuit 193, the coordinate transposition of the x-axis for y-axis required due to the main scanning of the processed image and that of the recorded image is performed, and a multiplication of each coordinate string by the ratio of expansion/compression is performed so as to be adaptable to the expansion/compression process.

In an example case where the supplied image is doubled in both of the main scanning and the sub-scanning directions, the coordinate conversion is performed in such a way that the x- and y-coordinates of each apex coordinate data string, which has been subjected to the second smoothing process, are doubled, and the fractions of 0.5 and over are counted as a unit and the rest is cut.

As described above, the outline coordinate data strings obtained by the circuits 191 and 194 are outputted to the memory B111. Thus, the process is completed.

Binary Image Reproducing Circuit and Intermediate Circuit

In the first embodiment, a page memory is used in which a bit map image memory is used by a quantity for one frame. The method of converting the outline coordinate data strings into the binary raster image can be completely effectively employed.

In the binary image reproducing circuit 110, an outline coordinate data strings stored in the memory B111 shown in FIG. 1 are read, and outlines for one image frame are drawn on the bit map image memory of the memory A103.

Since the drawing operation can be performed at high speed by the ensuing inside drawing circuit, and the outlines are drawn by the bit map image for one page, two or three line segment vectors (vectors connecting each coordinate of the outline coordinate strings) positioned continuously are paid attention, and references are made to the states (directions) of the subject line segment vector, a vector immediately in front of the subject line segment vector, and a vector immediately in the rear of the subject line segment vector so as to control the method of drawing the outline pixels present on the subject line segment vector. The contents of the control are as follows: an end point on the subject line segment vector, and points on the outline vector other than the end point are individually treated, and a selection is made from a group consisting of an operation in which they are not drawn, an operation in which they are drawn at the pixel position on the line segment vector, and an operation in which they are drawn while being shifted in the main scanning direction on the line segment vector to a position shifted to the adjacent pixel. The actual operation of drawing the outline pixel is performed in such a way that the obtained exclusive OR (EXOR) of a stored value and 1 is stored at the pixel position to be drawn. In either case, the pixels are sequentially read in the main scanning direction, so that the outline is so drawn as to enable the pixels to be switched.

Figure 20:
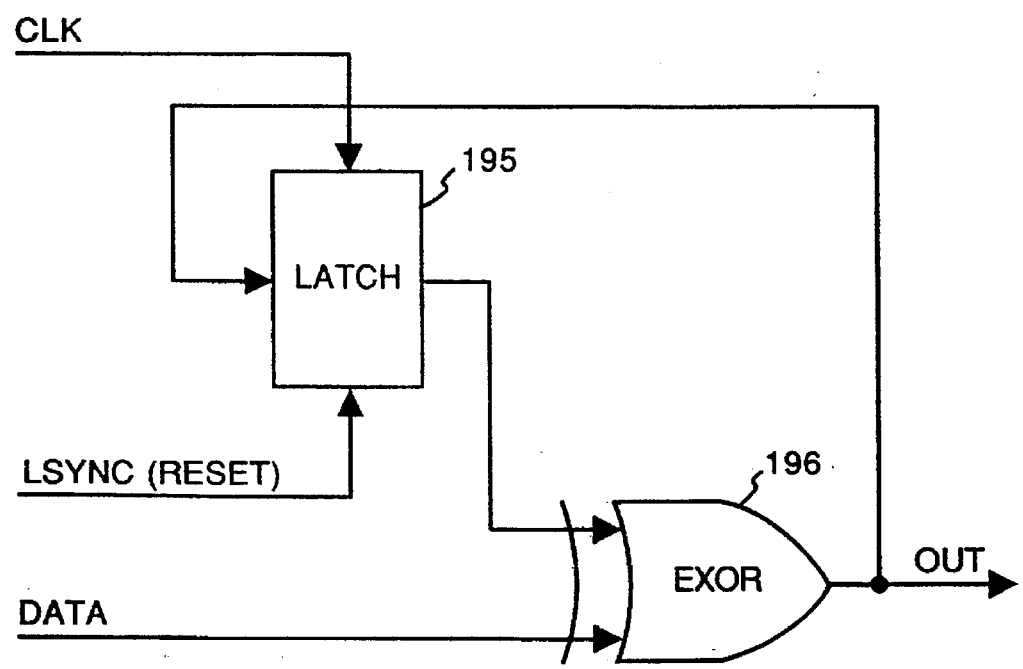
FIG. 20 is a circuit diagram of an inside filling-in circuit in the first embodiment.

In the inside drawing circuit 104, the inside drawing process is performed by a pipe line process while reading the image having the drawn outlines because it has been subjected to the process of drawing all of the outline edges in a predetermined outline drawing circuit and stored in the bit map image memory (memory A103) by raster scanning at an arbitrary synchronizing timing. Then, it is again transferred to the bit map image. The inside drawing process is performed by a circuit shown in FIG. 20 in such a way that DATA received in synchronization with a signal CLK is outputted to an terminal OUT in a state where the outline-drawn pixels are sequentially inverted between white and black. Symbols LSYNC is a line synchronizing signal which is supplied as a synchronization reset signal at the time of starting the input of the raster image. Reference numeral 195 denotes a latch which holds the value of output OUT of a pixel positioned forwards by one pixel. Reference numeral 196 denotes an EXOR which outputs the EXOR of supplied data and the value of output OUT of the pixel positioned forwards by one pixel. That is, the output OUT becomes "1" or "0" whenever the outline points are supplied as DATA.

Although the character/line image and the half tone image are, in this embodiment, separated from each other by the image region separation circuit, the region table for separating the image region can be omitted from the structure if the attribute of the image can be previously known by a mode selection button of the image scanner or a communication protocol, and the switching whether or not the pixel density conversion by extracting the outline on the basis of the attribute of the image may be performed. In addition, it is not always necessary in this embodiment for a circuit exclusively used to divide the original image into the character/line region (the binary image region) and the halftone image region to be provided. Since a pseudo half tone image has much outline coordinate data strings in one closed loop thereof as compared with a character/line image and the direction of the vector frequently changes in one closed loop, another arrangement may be employed in which switching is, at the moment the smoothing process is performed, is performed whether or not the smoothing process is performed on the basis of the total number of the outline coordinate data strings in one closed loop in place of the image region separation circuit 200 and the region discrimination table, resulting in that the image region separation function can easily be realized. It can be processed specifically as follows.

That is, since the minimum and maximum points of the x- and y-coordinate points of all of the vectors forming one closed loop can be obtained, the size of a rectangular circumscribed with the aforesaid closed loop can be determined. Namely, the size of the closed loop can indirectly taken out as the size of the rectangular. Hence, in accordance with the relationship between the size of the rectangular and the total number which forms the closed loop, a discrimination can be made as to whether or not smoothing is performed, that is, whether the closed loop is the half tone image or the character/line image. It should be noted that the relationship between the size of the rectangular and the closed loop may be stored while being formed into a table or a formula.

Consequently, it is possible to determine, on the basis of the vector obtained in series of processes of extracting an edge vector of an image, whether the original image is a halftone image or a binary image.

In this embodiment, both of the enlargement/contraction (expansion/compression) process and the coding process to be performed by utilizing the outline coordinate data strings and the enlargement/contract process by using the binary raster image are performed. Therefore, the data size of the outline coordinate data strings and the data size of the MH, MR or MMR coded data can be subjected to a comparison, so that image data, the quantity of which is smaller, is transmitted, resulting in that the communication time to be efficiently shortened.

Since the quantity of the outline coordinate data strings becomes enlarged considerably depending upon the image, there is, depending upon the image, a risk of overflow of the memory at the time of extracting the outline coordinate data strings. In this case, the outline extraction process may be interrupted and switching to the coordinate conversion (expansion/compression) process by using the binary raster image may be performed. That is, the final address position of the rough outline vector table, which is being constituted, and the final effective address position of the memory are subjected to a comparison because the capacity of the memory B111 is previously known.

As for the expansion/compression by converting the coordinate as described above, different ratio of expansion/compressio can, of course, be multiplied to the main scanning and the sub-scanning, and therefore, it can be performed for the x-axis and the y-axis individually. The aforesaid process is performed in such a way that the size of the received original image and the size of the paper sheet for use in printing out are subjected to a comparison, and the ratio of expansion/compression of the x-axis and that of the y-axis are calculated. The ratio of expansion/compression may be arbitrarily selected in accordance of the will of a user (operator). Furthermore, the ratio of expansion/compression of the x- and the y-axes may be processed by the transmission side as a result of negotiation, or it may be processed by the receiving side at the time of printing received data.

Although black isolated points and notches are, in order to remove dust pixels, removed in the smoothing process according to the first embodiment, the notch and the isolated pixel removal patterns may be separated from the smoothing pattern by using an external switch mode (for example, by a switch provided on an operation panel which is omitted from illustration) because the notches and the isolated points of image data read with the standard resolution conformed to G3 are required as information to read the character in many cases. By using an external mode key, switching whether or not the smoothing process is performed can, of course, be performed.

Figure 25:
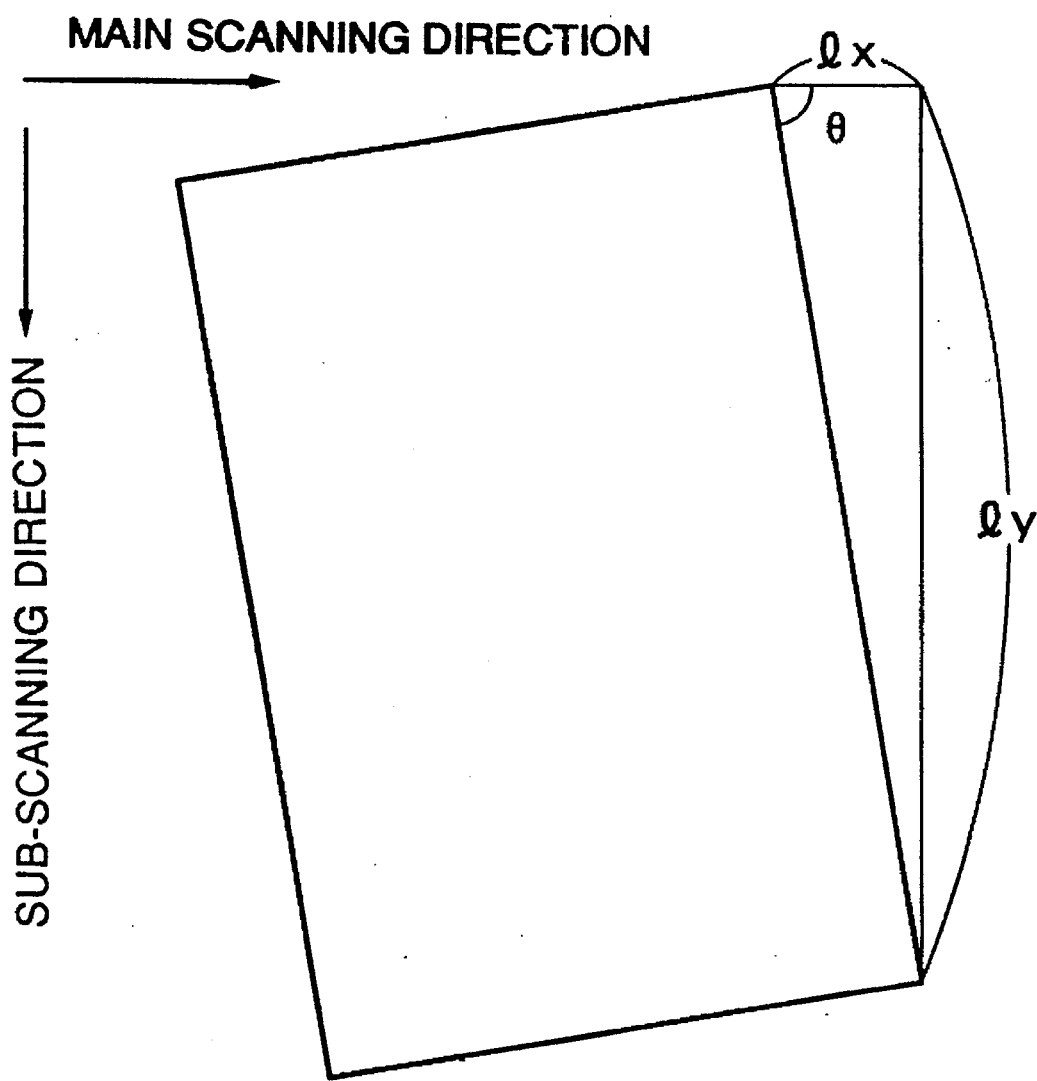
FIG. 25 illustrates the principle of the correction process performed when an original is read in an inclined way.

The coordinate conversion circuit 109 according to the first embodiment performs only the transposition of the x- for the y-coordinates and the multiplication by a ratio of expansion/compression. The read original document positions undesirably diagonally can be corrected by performing, at the aforesaid processes, the coordinate rotation by an affin transformation of the outline coordinate data strings on the basis of the output value from an apparatus (omitted from illustration) for detecting the diagonal angle of a read original document. In this case, the edge positions of the original document in the main scanning direction are sequentially detected if the original document is conveyed in the sub-scanning direction or if the scanner is moved in the sub-scanning direction to read the original document as shown in FIG. 25. That is, since the deviation quantity ιx taken place when one original document sheet has been read and the conveyance quantity ιy taken place at this time in the sub-scanning direction are detected, the diagonal angle θ of the original document can be obtained by $$\tan^{-1}(\iota y/\iota x).$$

A variety of means can be considered to detect the change of the edge position of the original document. In an example case in which the recording side of the original document is read while conveying the original document, the color of the background (the color to be detected if no read original document is present) at the reading position is made to be a color other than white. Since the background color of the original document is usually white, the edge can be detected by only making distinction from the white color of the background. As an alternative to this, the degree of the diagonal state may be detected by providing a pressing plate, which presses the original document sheet by small force which is applied thereto in a lateral direction in the original document conveyance direction and which is so determined as not to fold the original document sheet, and which is able to move in the horizontal direction (main scanning) direction, so as to detect the lateral movement quantity of the pressing plate with respect to the quantity of the conveyance of the original document.

The aforesaid diagonal state modification process may be arranged in such a way that the image of a read original document is reversely rotated (affin-transformed) by the obtained diagonal angle after the read image has been stored in the memory A103 or at the time of storing it. Then, the aforesaid process may be performed. As an alternative to this, coordinate data obtained by the aforesaid second smoothing process may be subjected to the rotation process. Although the aforesaid process may be automatically performed in the case where the diagonal state is modified, this fact may be notified to the operator (by, for example, a display made in a display portion provided for the operation panel) and the operator may instruct whether or not the modification of the diagonal state is performed.

Another structure may be employed in which an arbitrary angle is instructed by using the operation panel to rotate the image, regardless of reading of the diagonal state of the original document. That is, a countermeasure against occurrence that the characters of the original document to be read is previously diagonally placed.

Although the binary image reproducing circuit 110 is arranged to use a page memory which uses the image memory of the bit map for one picture frame, a scan line conversion (a packet sort method) may be employed which uses an edge table and an active edge table and which draws the ridge edge of the outline image by a line buffer for several lines.

Although this embodiment uses the printer as the image output apparatus, an image can be outputted onto a display by using a Video memory and a display in place of the FIFO 105 and the printer 106 shown in FIG. 1.

Furthermore, an example of the application of communication which use the outline coordinate data strings may be employed which is arranged in such a way that a digitizer, which shows the image position, is individually provided and a decoration code (change of net decoration or inside drawing pattern, or change of the color) is additionally transferred to the closed loop of the outline coordinate data in region instructed by the digitizer. As a result, the receiving side is easily executing the change of the net decoration pattern or the inside drawing pattern or the change of the color in accordance with the decoration code.

As an alternative to the arrangement in which font is developed into a binary raster image as is done in the case of the report or the header before transmission, it can be directly transmitted/received as font data using an outline, or the development of the conventional outline is commonly used by the binary image reproducing and the inside drawing circuits, so that the output of the outline font can easily be performed.

The operations employed in the conventional resolution conversion can, of course, be realized in this embodiment, and therefore, the arbitrary expansion/compression process, in which a ratio of expansion/compression instruction key is used, and a process for causing an elongated original document to be included by a regular-size cut paper by detecting the cassette size can be realized in the structure according to this embodiment.

As described above, according to this embodiment, even if the original document is undesirably diagonally read, the degree of the diagonal state is corrected by the reverse rotation, resulting in an excellent image, which is normally placed, can be obtained.

Since the outline vector is extracted and the process is performed on the basis of the extracted outline vector as well as treating the bit image of the original image, the generation of rough edges can be prevented.

Furthermore, the arrangement in which data obtained on the basis of the extracted outline vector is transmitted to the other end of the data line, and the receiving side reproduces and outputs an image on the basis of the received data will enable the time required to perform the communication to be shortened and enable transmission of precise image to be performed.

In addition, since the outline vector extracted from the original image is smoothed and therefore the vector is enlarged to reproduce the image, a high grade image can be obtained regardless of the ratio of expansion/compression.

Since the process of expansion/compression of the extracted outline vector is performed only when the resolution conversion is required, the load acting on the system can be minimized. Therefore, the reduction in the processing speed at an ordinary process can be prevented.

When the outline vector is extracted from the read binary image, a discrimination is made as to whether or not the storage size of the outline vector is larger than the memory capacity. If a discrimination is made that the memory over takes place, the process of extracting the outline vector is immediately interrupted and switching to the process by using the binary image is performed. As a result, printing or transmission can be correctly performed even if the problem of memory over takes place.

In the case where the expansion/compression process is performed on the basis of outline vector data, whether or not the smoothing process is performed in switched by using an external switch. As a result, whether the smoothing process is performed or a high processing speed is realized can be selected by the operator. Furthermore, the smoothing process is performed when the expansion/compression process of the read or received image is performed, an image revealing high quality and freed from distortion can be obtained. Furthermore, if an arrangement is employed in which the ratio of expansion/compression is instructed by a switch (omitted from illustration), an image having a desired size can be obtained. In addition, the expansion/compression process is performed on the basis of the outline vector size at only the time of performing the enlargement process. Therefore, the load acting on the apparatus can be lightened, and, hence, the undesirable reduction of the processing speed can be prevented at the time of the equal-magnification process or the size contraction process.

The expansion/compression process by using the outline vector is effective to only the character/line image, but the obtainable result is unsatisfactory if the half tone image is subjected to the aforesaid process. However, the aforesaid embodiment is arranged in such a way that only the character/line image is subjected to the expansion/compression process which uses the outline vector data, and expansion/compression of the half tone image is varied by an interpolation of the pixel forming the image or by thinning the same. Hence, an excellent image can be obtained.

In the communication performed between the apparatuses according to the embodiment, data to be transmitted may be outline coordinate data, and the transmission side or the receiving side is able to individually expand/compress data in the x- and y-directions. Therefore, an excellent and desired image can be obtained even if the expansion/compression is performed.

As described above, according to the first embodiment, the resolution conversion is performed only when the resolution conversion must be performed, and the deterioration of the image taken place due to the resolution conversion can be substantially prevented. Therefore, the load acting on the apparatus can be lightened and a high quality image can be transmitted.

Furthermore, the outline vector is extracted only when the resolution must be converted before it is smoothed to generate an image, resulting in an effect to be obtained in that a high quality image can be transferred.

The present invention may be applied to a system constituted by a plurality of apparatuses, or to a simple system having one apparatus. The present invention may, of course, be applied to the case where a program is supplied to a system or an apparatus.

Second Embodiment

A second embodiment of the present invention will now be described.

In the first embodiment, the switch for selecting whether the smoothing process is performed may or may not be provided.

However, if the switch is turned on and the notch removal process is thereby performed in all cases without the type of an original or the resolution of a read image taken into consideration, a halftone image may be adversely affected. Also, there is the possibility that the isolated points in an image read at a low resolution, which should not be removed, are removed. Furthermore, even where the user desires to faithfully reproduce the original image, the notch removal process is performed regardless of the intention of the user.

Hence, a second embodiment of the present invention solves the above-described problems.

A preferred second embodiment of the present invention will be described below with reference to the accompanying drawings.

Figure 26:
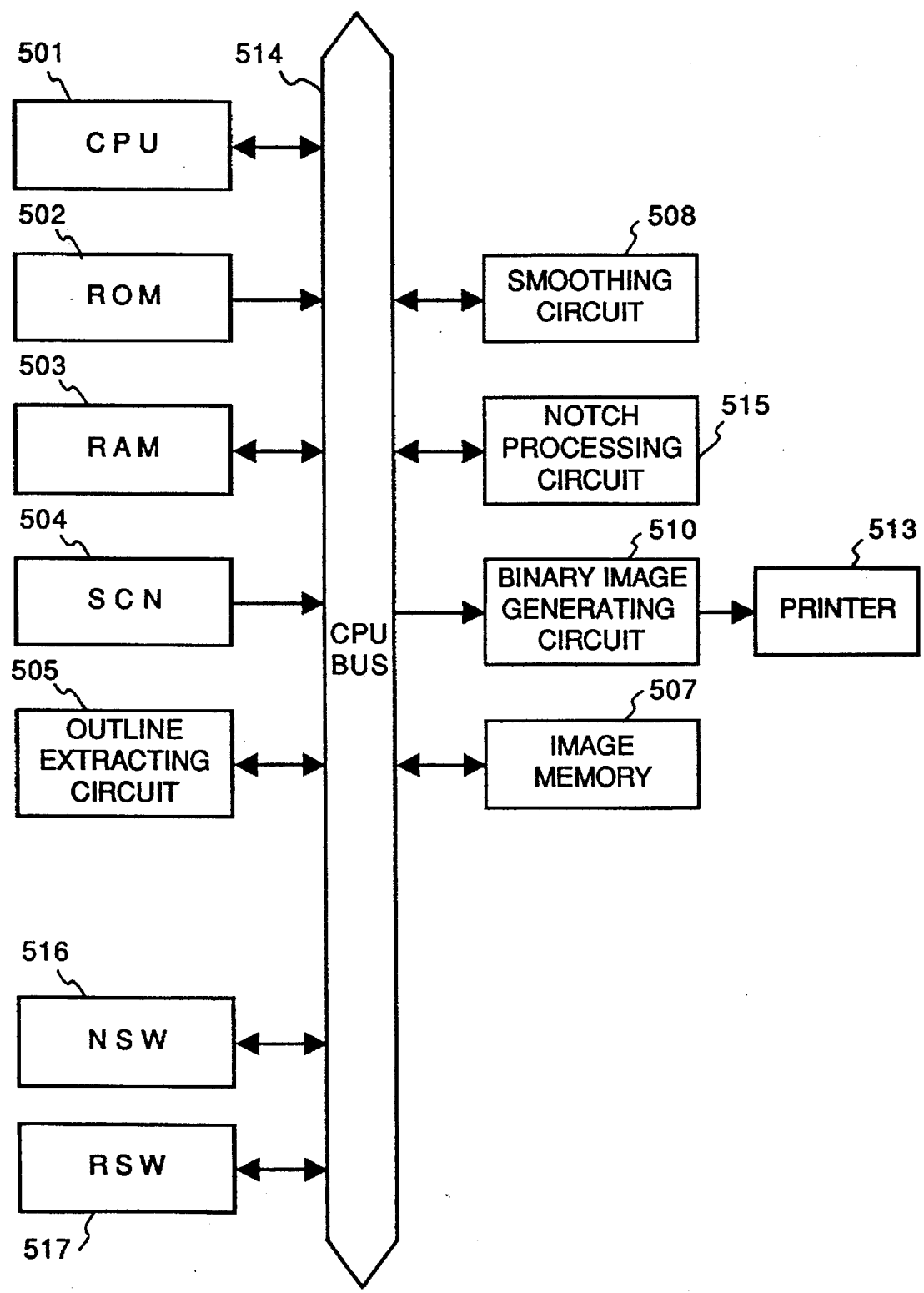
FIG. 26 is a block diagram of a second embodiment of an image processing apparatus according to the present invention.

FIG. 26 is a block diagram of a second embodiment of an image processing apparatus of reading an image original, extracting an outline vector and outputting an image. In FIG. 26, reference numeral 501 denotes a CPU for performing control of an entire apparatus; 502 denotes a ROM for storing a control program executed by the CPU 501; 503 denotes a RAM used as the working region required to execute the control program; 504 denotes a scanner portion (SCN) of reading an image original and generating binary image data; 505 denotes an outline extracting circuit for extracting an outline vector of the binary image data; 507 denotes an image memory for storing the outline vector and data obtained by smoothing which will be described later; 508 denotes a smoothing circuit of performing smoothing/pixel density conversion on an image by operating the outline data stored in the image memory 507 and for generating smoothed data; 510 denotes a binary image generating circuit for generating binary image data from the outline data (or from the smoothed data); 513 denotes a printer for outputting an reproduced binary image from the binary image data; 515 denotes a notch processing circuit for performing a notch process by extracting a vector row which is determined as a notch from the outline vector stored in the image memory 507 and for outputting the outline vector to the image memory 507 again; 516 denotes a notch process setting switch (NSW) operated by the operator to instruct execution of the notch process to the CPU 501; 517 denotes is a reading resolution setting switch (RSW) used by the operator to instruct the resolution at which an original is read to the CPU 501; and 514 denotes a CPU bus for connecting the above components with each other.

The smoothing circuit 508 in the second embodiment performs substantially the same process as that conducted by the smoothing/coordinate transformation circuit 109 in the first embodiment, detailed description thereof being omitted. The difference between the smoothing circuit 508 and the smoothing/coordinate transformation circuit 109 is that the smoothing circuit 508 does not perform the processes shown in FIGS. 11, 14A and 14B, because these pixel states are the objects of the process performed on the basis of an instruction given by a notch removal setting switch NSW 516.

Next, the image reading/reproducing process executed by the image processing apparatus arranged in the manner described above will be described below with reference to FIG. 27.

First, in step S601, the operator places an image original on the scanner portion (SCN) 504, sets the notch process setting switch (NSW) 516 and the reading resolution setting switch (RSW) 517, and depresses a starting key (not shown) of the apparatus. In step S601, the CPU 501 gives an instruction to the scanner portion (SCN) 504 according to the resolution set by the operator to initiate reading of an image original. Subsequently, in step S603, the CPU 501 stores binary image data of one line read and generated by the scanner portion (SCN) 504 in the image memory 507, and then in step S604, the CPU 501 conveys the image original in the vertical direction by a predetermined amount of feed corresponding to the resolution set by the resolution setting switch 517. In step S605, it is determined whether the final end of the image original is detected. If the final end of the image original to be read is not reached, the process returns to step S603, and an image of a subsequent line is read. If the final end of the image original is detected, reading of the image original of one page is completed, and the process goes to step S606.

In step S606, the CPU 501 supplies the read binary image data to the outline extraction circuit 505 and initiates the outline extraction process when a processable number of lines of the binary image data has been input. In the outline extraction process, the binary image data is converted into an outline vector row (corresponding to the rough contour vector data in the first embodiment). The results of the outline extraction process are output to the image memory 507 again. In step S607, the CPU 501 inputs the outline data stored in the image memory 507 to the smoothing circuit 508, and executes the smoothing process. The results of the smoothing process are output to the image memory 507 in the form of an outline vector row again. As stated above, the smoothing circuit 508 does not perform the notch removal process shown in FIGS. 11, 14A and 14B.

In step S608, the CPU 501 reads the set state of the notch process setting switch (NSW) 516 and the set state of the reading resolution setting switch (RSW) 517, and determines whether the set state of the notch process setting switch (NSW) 516 is a notch process instructing state and the set state of the reading resolution setting switch (RSW) 517 is a high resolution reading instructing state. If the answer is affirmative, the process goes to step S609, and the outline vector row is input to the notch processing block 515 to execute the notch removal process, that is, the process shown in FIGS. 11, 14A and 14B is performed. The results of the notch removal process are output to the image memory 507 in the form of an outline vector row. If it is determined that the notch removal process has not been instructed or the instructed reading resolution is low, the process goes to step S610.

In step S610, the CPU 501 inputs the outline vector row stored in the image memory 507 into the binary image generating circuit 510, generates binary image data, and outputs it to the printer 513. Finally, in step S611, the printer 513 outputs a reproduced image of one page on the basis of the binary image data. In other words, the notch removal process is performed only when the original is read at a high resolution.

Thus, since the notch process setting switch (NSW) 516 and the reading resolution setting switch (RSW) 517 are provided in the second embodiment, it is possible to perform the notch removal process according to the instruction given by the operator or the image reading resolution.

In the second embodiment, a reproduced image is output from the printer. However, the present invention is not limited to this, and the reproduced image may be output to another recording media (such as a semiconductor memory or a magnetic disk). Furthermore, in the second embodiment, the image reading resolution has been described as high and low resolutions. This may sound that the number of selectable resolutions is two. However, the present invention is not limited to this and the number of resolutions selectable by the reading resolution setting switch (RSW) may be set to N, and the low resolution may be defined as lower M resolutions in the N resolutions. In the above-described first and second embodiments, an isolated single pixel or a protruding or recessed single pixel has been described as a notch. However, this may depend on the resolution. More specifically, in the case of a high resolution, at least two consecutive pixels may be described as a notch.

The present invention can be applied to a system made up of a plurality of devices or an apparatus made up of a single device. The present invention can also be applied to a system or a case in which a program is supplied to the apparatus.

In the second embodiment, since the notch removal process is performed according to the designated image original reading resolution and/or the notch removal instruction, execution of the notch removal process is made selectable, and notch removal can thus be performed according to the intention of the operator or the type of the image original. Consequently, generation of deterioration in the image quality due to the uniform notch removal process can be restricted.

In the second embodiment, when an original is read at a high resolution and when the notch removal process is instructed, a notch is removed. That is, there are two conditions under which notch removal is performed in the second embodiment. Another condition, in which it is determined whether the original image is a binary image, such as a character or a line, or a halftone image, such as a photograph, may be added to the above two conditions. That is, if the original image is a binary image, such as a character or a line, if the original is read at a high resolution and if notch removal is instructed, notch removal may be performed in step S609. The third condition is added because when the original is binarized on the basis of the dither method or the error diffusion method, the generated isolated pixel is not a notch but a pixel representing the apparent density of that image: not a pixel generated by noise or like. The operator may designate whether the original image is a halftone image or a binary image by operating a separately provided switch. Alternatively, as described in the first embodiment, the determination may be made on the basis of changes in the density of read image data (which is not yet binarized). In addition, where the original image has both a character region and a photographic region, the latter region is the object of notch removal, as in the case of the first embodiment.

The step S607 shown in FIG. 27 may be executed immediately before step S610. This allows a smoothing circuit 508 having exactly the same structure as that of the first embodiment to be employed.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   input means for inputting an image;
   discrimination means for discriminating whether a region in the image input be said input means is a character/line region or a pseudo-halftone image region;
   contour extraction means for extracting contour vector data along an image edge in the character/line image region discriminated by said discriminating means;
   first image generating means for enlarging/reducing the vector data extracted by said contour vector extraction means and for generating image data on the basis of the enlarged/reduced vector data if said discrimination means discriminates that the region in the image input by said input means is a character/line region; and
   second generating means for deactivating said contour vector extraction means and for generating image data by enlarging/reducing the input image in the pseudo-halftone image region if said discrimination means discriminates that the region in the image input by said input means is a pseudo-halftone image region.

2. The apparatus according to claim 1, wherein said input means comprises an image scanner.

3. The apparatus according to claim 1, further comprising output means for outputting an image data generated by said generating means.

4. The apparatus according to claim 3, wherein said output means comprises a printer.

5. An image processing method comprising the steps of:
   inputting an image;
   discriminating whether a region in the image input in said inputting step is a character/line region or a pseudo-halftone image region;
   extracting contour vector data along an image edge in the character/line image region discriminated in said discriminating step;
   enlarging/reducing the vector data extracted by said contour vector extraction means and generating image data on the basis of the enlarged/reduced vector data if the region in the input image is determined to be a character/line region in said discrimination step; and
   deactivating said contour vector extracting step and generating output image data by enlarging/reducing the input image in the pseudo-halftone image region if the region in the input image is determined to be a pseudo-halftone image region in said discriminating step.

6. The method according to claim 5, wherein said inputting step includes inputting an image via an image scanner.

7. The method according to claim 5, further comprising the step of outputting an image generated in said generating step.

8. The method according to claim 7, wherein said outputting step includes outputting the image to a printer.

9. An image processing apparatus comprising:
   input means for inputting an image;
   contour extraction means for extracting contour vector data along an image edge of the image input by said input means;
   memory means for storing the extracted contour vector data;
   determination means for determining whether said memory means has overflown with contour vector data when the extracted contour vector data is stored into said memory means; and
   generating means for enlarging/reducing the vector data stored in said memory means, and for generating image data on the basis of the enlarged/reduced vector data, if said determination means determines that said memory means has sufficient capacity to store additional extracted contour vector data, while deactivating said contour extraction means and generating image data by enlarging/reducing the image data input by said input means if said determination means determines that said memory means has overflown with extracted contour vector data.

10. The image processing apparatus according to claim 9, further comprising output means for outputting image data generated by said generating means.

11. The image processing apparatus according to claim 10, wherein said output means comprises a printer.

12. The image processing apparatus according to claim 9, further comprising input means for inputting image data.

13. The image processing apparatus according to claim 12, wherein said input means comprises an image scanner.

14. An image processing method comprising the steps of:
   inputting an image;
   extracting contour vector data along an image edge of the input image;
   storing the extracted contour vector data in a memory;
   determining whether the memory has overflown with contour vector data when the extracted contour vector data is stored into said memory; and
   enlarging/reducing the vector data stored in the memory and generating image data on the basis of the enlarged/reduced vector data if the memory has sufficient capacity to store additional extracted contour vector data as determined in said determining step, while deactivating the contour extraction step and generating image data by enlarging/reducing the input image data if the memory has overflown with extracted contour vector data as determined in said determining step.

15. The image processing method according to claim 14, further comprising the step of outputting the generated image data.

16. The image processing method according to claim 15, wherein said outputting step is performed using a printer.

17. The image processing method according to claim 14, further comprising the step of inputting image data.

18. The image processing apparatus according to claim 17, wherein said inputting step is performed using an image scanner.

19. An image processing apparatus in which image data is input and an image is reproduced by a predetermined device, said apparatus comprising:

contour extraction means for extracting contour coordinate data along an edge of the input image;

smoothing means for smoothing the extracted contour coordinate data; and reproduction means for reproducing the image on the basis of the contour coordinate data which has been smoothed by said smoothing means, wherein said smoothing means includes first smoothing means and second smoothing means, said first smoothing means including:

discrimination means for discriminating a point position which is not an object of smoothing on the basis of the connection relation between the predetermined number of consecutive vectors in the vector data extracted by said contour extraction means;

deletion means for deleting the vector data which forms a closed-loop extracted by said contour extraction means when the vector data has a size smaller than or equal to a predetermined size;

connecting means for deleting the vector data which forms an irregularity having a size smaller than or equal to a predetermined size when the irregularity is present within a region having a predetermined length in the extracted vector data and for connecting the vectors located in advance of and beyond the irregularity; and means for allowing for a slanting vector by deleting a plurality of vertical or horizontal vectors in the predetermined number of vectors on the basis of a length and a direction of each of the consecutive predetermined number of vectors and by correcting a starting or ending coordinate position of the remaining vectors, and said second smoothing means including means for correcting the starting or ending point position of the single vector in the consecutive vector data smoothed by said first smoothing means except for the point which is not determined as the object of smoothing by said discrimination means by calculating a weighted mean of the starting or ending point coordinates of the plurality of vectors located in advance of beyond the single vector.

20. The apparatus according to claim 19, further comprising input means for inputting an image.

21. The apparatus according to claim 20, wherein said input means comprises an image scanner.

22. The apparatus according to claim 19, further comprising generating means for generating an image on the basis of the vector data.

23. The apparatus according to claim 22, further comprising output means for outputting image data generated by said generating means.

24. The apparatus according to claim 23, wherein said output means comprises a printer.

25. An image processing method in which image data is input and an image is reproduced by a predetermined device, said method comprising the steps of:

extracting contour coordinate data along an edge of the input image;

smoothing the extracted contour coordinate data; and reproducing the image on the basis of the smoothed contour coordinate data, wherein said smoothing step includes a first smoothing step and a second smoothing step, said first smoothing step including the steps of:

discriminating a point position which is not an object of smoothing on the basis of the connection relation between the predetermined number of consecutive vectors in the vector data extracted in said contour extraction step;

deleting the vector data which forms a closed-loop extracted in said contour extraction step when the vector data has a size smaller than or equal to a predetermined size;

deleting the vector data which forms an irregularity having a size smaller than or equal to a predetermined size when the irregularity is present within a region having a predetermined length in the extracted vector data and for connecting the vectors located in advance of and beyond the irregularity; and allowing for a slanting vector by deleting a plurality of vertical or horizontal vectors in the predetermined number of vectors on the basis of a length and a direction of each of the consecutive predetermined number of vectors and by correcting a starting or ending coordinate position of each of the remaining vectors, and said second smoothing step including the step of correcting the starting or ending point position of the single vector in the consecutive vector data smoothed in said first smoothing step except for the point which is not determined as the object of smoothing in said discrimination step by calculating a weighted mean of the starting or ending point coordinates of the plurality of vectors located in advance of beyond the single vector.

26. The method according to claim 25, further comprising the step of inputting an image.

27. The method according to claim 26, wherein said inputting step includes inputting an image via an image scanner.

28. The method according to claim 25, further comprising the step of generating an image on the basis of the vector data.

29. The method according to claim 28, further comprising the step of outputting an image generated in said generating step.

30. The method according to claim 29, wherein said outputting step includes outputting the image to a printer.

31. An image processing apparatus in which image data is input and is output to a predetermined device, said apparatus comprising:

contour extraction means for extracting contour vector data along an edge of the input image;

storage means for storing the extracted contour vector data;

image generation means for generating an image to be output to said predetermined device on the basis of the contour vector stored in said storage means, said apparatus further comprising control means for controlling such that the input image is output to said predetermined device when it determines during storage that the contour vector to be stored in said storage means exceeds a storage capacity of said storage means; and smoothing means including first smoothing means and second smoothing means, said first smoothing means including:

discrimination means for discriminating a point position which is not an object of smoothing on the basis of the connection relation between the predetermined number of consecutive vectors in the vector data extracted by said contour extraction means;

deletion means for deleting the vector data which forms a closed-loop extracted by said contour extraction means when the vector data has a size smaller than or equal to a predetermined size;

connecting means for deleting the vector data which forms an irregularity having a size smaller than or equal to a predetermined size when the irregularity is present within a region having a predetermined length in the extracted vector data and for connecting the vectors located in advance of an beyond the irregularity; and means for allowing for a slanting vector by deleting a plurality of vertical or horizontal vectors in the predetermined number of vectors on the basis of a length and a direction of each of the consecutive predetermined number of vectors and by correcting a starting or ending coordinate position of the remaining vectors, and said second smoothing means including means for correcting the starting or ending point position of the signal vector in the consecutive vector data smoothed by said first smoothing means except for the point which is not determined as the object of smoothing by said discrimination means by calculating a weighted mean of the starting or ending point coordinates of the plurality of vectors located in advance of beyond the single vector.

32. An image processing apparatus according to claim 31, wherein said predetermined device is a printer.

33. An image processing apparatus according to claim 31, wherein said predetermined device is a facsimile machine connected to a communication line.

34. An image processing apparatus according to claim 31, further comprising smoothing means for separately correcting a predetermined number of consecutive vector data items in the contour vector data extracted by said contour extraction means on the basis of the predetermined number of vector data items such that a locus expressed by the vector data items are smoothed, the expansion or compression process being conducted on the vector data items corrected by said smoothing means.

35. The apparatus according to claim 31, further comprising input means for inputting an image.

36. The apparatus according to claim 35, wherein said input mean comprises an image scanner.

37. The apparatus according to claim 31, further comprising generating means for generating an image on the basis of the vector data.

38. The apparatus according to claim 37, further comprising output means for outputting image data generated by said generating means.

39. The apparatus according to claim 38, wherein said output means comprises a printer.

40. An image processing method in which image data is input and output to a predetermined device, said method comprising the steps of:

extracting contour vector data along an edge of the input image;

storing the extracted contour vector data in a predetermined memory;

generating an image to be output to the predetermined device on the basis of the contour vector stored in the memory;

controlling such that the input image is output to the predetermined device when it is determined during storage that the contour vector to be stored in the memory exceeds a storage capacity of the memory; and smoothing, including a first smoothing step and a second smoothing step, said first smoothing step including the steps of:

discriminating a point position which is not an object of smoothing on the basis of the connection relation between the predetermined number of consecutive vectors in the vector data extracted in said contour extraction step;

deleting the vector data which forms a closed-loop extracted in said contour extraction step when the vector data has a size smaller than or equal to a predetermined size;

deleting the vector data which forms an irregularity having a size smaller than or equal to a predetermined size when the irregularity is present within a region having a predetermined length in the extracted vector data and for connecting the vectors located in advance of and beyond the irregularity; and allowing for a slanting vector by deleting a plurality of vertical or horizontal vectors in the predetermined number of vectors on the basis of a length and a direction of each of the consecutive predetermined number of vectors and by correcting a starting or ending coordinate position of each of the remaining vectors, and said second smoothing step including the step of correcting the starting or ending point position of the single vector in the consecutive vector data smoothed by said first smoothing step except for the point which is not determined as the object of smoothing in said discrimination step by calculating a weighted mean of the starting or ending point coordinates of the plurality of vectors located in advance of beyond the single vector.

41. An image processing method according to claim 40, wherein said predetermined device is a printer.

42. An image processing method according to claim 40, wherein said predetermined device is a facsimile machine connected to a communication line.

43. An image processing method according to claim 40, further comprising the step of separately correcting a predetermined number of consecutive vector data items in the contour vector data extracted in said contour extraction step on the basis of the predetermined number of vector data items such that a locus expressed by the vector data items are smoothed, said storage means storing the vector data items corrected in said smoothing step.

44. The method according to claim 40, further comprising the step of inputting an image.

45. The method according to claim 44, wherein said inputting step includes inputting an image via an image scanner.

46. The method according to claim 40, further comprising the step of generating an image on the basis of the vector data.

47. The method according to claim 46, further comprising the step of outputting an image generated in said generating step.

48. The method according to claim 47, wherein said outputting step includes outputting the image to a printer.

49. An image processing apparatus comprising:

contour extraction means for extracting contour vector data along an edge of the input image;

counting means for counting a number of points representing vectors in each of contour closed-loops extracted by said contour extraction means;

detection means for detecting a size of each of the closed loops on the basis of the extracted contour vector data; and discrimination means for discriminating whether an image region represented by each of the closed loops is a halftone image or a character/line image on the basis of the size of each of the closed loops detected by said detection means and the number of vector points corresponding to each of the closed loops, wherein said smoothing means includes first smoothing means and second smoothing means, said first smoothing means including:
discrimination means for discriminating a point position which is not an object of smoothing on the basis of the connection relation between the predetermined number of consecutive vectors in the vector data extracted by said contour extraction means;

deletion means for deleting the vector data which forms a closed-loop extracted by said contour extraction means when the vector data has a sized smaller than or equal to a predetermined size;

connecting means for deleting the vector data which forms an irregularity having a size smaller than or equal to a predetermined size when the irregularity is present within a region having a predetermined length in the extracted vector data and for connection the vectors located in advance of and beyond the irregularity; and means for allowing for a slanting vector by deleting a plurality of vertical or horizontal vectors in the predetermined number of vectors on the basis of a length and a direction of each of the consecutive predetermined number of vectors and by correcting a starting or ending coordinate position of the remaining vectors, and said second smoothing means including means for the single vector in the consecutive vector data smoothed by said first smoothing means except for the point which is not determined as the object of smoothing by said discrimination means by calculating a weighted mean of the starting or ending point coordinates of the plurality of vectors located in advance of beyond the single vector.

50. An image processing apparatus according to claim 49, further comprising smoothing means for separately correcting a predetermined number of consecutive vector data items in the contour vector data extracted by said contour extraction means on the basis of the predetermined number of vector data items such that a locus expressed by the vector data items are smoothed, and output means for outputting an image to a predetermined device on the basis of the corrected vector data items.

51. An image processing apparatus according to claim 50, wherein said predetermined device is a printer.

52. An image processing apparatus according to claim 50, wherein said predetermined device is a facsimile machine connected to a communication line.

53. The apparatus according to claim 49, further comprising input means for inputting an image.

54. The apparatus according to claim 53, wherein said input means comprises an image scanner.

55. The apparatus according to claim 49, further comprising generating means for generating an image on the basis of the vector data.

56. The apparatus according to claim 55, further comprising output means for outputting an image data generated by said generating means.

57. The method according to claim 56, wherein said output means comprises a printer.

58. An image processing method comprising the steps of:
extracting contour vector data along an edge of an input image;

counting a number of points representing vectors in each of extracted contour closed-loops;

detecting a size of each of the closed loops on the basis of the extracted contour vector data; and discriminating whether an image region represented by each of the closed loops is a halftone image or a character/line image on the basis of the size of each of the closed loops detected in said detection step and the number of vector points corresponding to each of the closed loops, wherein said smoothing step includes a first smoothing step and a second smoothing step, said first smoothing step including the steps of:
discriminating a point position which is not an object of smoothing on the basis of the connection relation between the predetermined number of consecutive vectors in the vector data extracted by said contour extraction step;

deleting the vector data which forms a closed-loop extracted by said contour extraction step when the vector data has a size smaller than or equal to a predetermined size;

deleting the vector data which forms an irregularity having a size smaller than or equal to a predetermined size when the irregularity is present within a region having a predetermined length in the extracted vector data and for connecting the vectors located in advance of and beyond the irregularity; and allowing for a slanting vector by deleting a plurality of vertical or horizontal vectors in the predetermined number of vector on the basis of a length and a direction of each of the consecutive predetermined number of vectors and by correcting a starting or ending coordinate position of each of the remaining vectors, and said second smoothing step including the step of correcting the starting or ending point position of the single vector in the consecutive vector data smoothed by said first smoothing step except for the point which is not determined as the object of smoothing by said discrimination step by calculating a weighted mean of the starting or ending point coordinates of the plurality of vectors located in advance of beyond the single vector.

59. An image processing method according to claim 58, further comprising the step of separately correcting a predetermined number of consecutive vector data items in the contour vector data extracted in said contour extraction step on the basis of the predetermined number of vector data items such that a locus expressed by the vector data items are smoothed, and outputting an image to a predetermined device on the basis of the corrected vector data.

60. An image processing method according to claim 59, wherein said predetermined device is a printer.

61. An image processing method according to claim 59, wherein said predetermined device is a facsimile machine connected to a communication line.

62. The method according to claim 58, further comprising the step of inputting an image.

63. The method according to claim 62, wherein said inputting step includes inputting an image via an image scanner.

64. The method according to claim 58, further comprising the step of generating an image on the basis of the vector data.

65. The method according to claim 64, further comprising the step of outputting an image generated in said generating step.

66. The method according to claim 65, wherein said outputting step includes outputting the image to a printer.

67. An image processing apparatus in which image data is input and an image is reproduced by a predetermined device, said apparatus comprising:

contour extraction means for extracting contour vector data along an edge of the input image;

comparison means for comparing a resolution of the input image with a resolution of said reproducing device;

smoothing means for smoothing the contour vector data extracted by said contour extraction means on the basis of the results of the comparison by said comparison means; and generation means for generating a recorded image on the basis of the contour vector data which has been smoothed by said smoothing means.

68. An image processing apparatus according to claim 67, wherein said smoothing means is turned on when said comparison means determines that the resolution of the input image is lower than the resolution of said reproducing device.

69. An image processing apparatus according to claim 67, wherein said smoothing means includes first smoothing means and second smoothing means, said first smoothing means including:

discrimination means for discriminating a point position which is not an object of smoothing on the basis of the connection relation between the predetermined number of consecutive vectors in the vector data extracted by said contour extraction means;

deletion means for deleting the vector data which forms a closed-loop extracted by said contour extraction means when the vector data has a size smaller than or equal to a predetermined size;

connecting means for deleting the vector data which forms an irregularity having a size smaller than or equal to a predetermined size when the irregularity is present within a region having a predetermined length in the extracted vector data and for connecting the vectors located in advance of and beyond the irregularity; and means for allowing for a slanting vector by deleting a plurality of vertical or horizontal vectors in the predetermined number of vectors on the basis of a length and a direction of each of the consecutive predetermined number of vectors and by correcting a starting or ending coordinate position of the remaining vectors, said second smoothing means including:

means for correcting the starting or ending point position of the single vector in the consecutive vector data smoothed by said first smoothing means except for the point which is not determined as the object of smoothing by said discrimination means by calculating a weighted means of the starting or ending point coordinates of the plurality of vectors located in advance of beyond the single vector.

70. An image processing method in which image data is input and an image is reproduced by a predetermined device, said method comprising the steps of:

extracting contour vector data along an edge of the input image;

comparing a resolution of the input image with a resolution of said reproducing device;

smoothing the contour vector data extracted in said contour extraction step on the basis of the results of the comparison of said comparison step; and generating a recorded image on the basis of the contour vector data which has been smoothed by said smoothing step.

71. An image processing method according to claim 70, wherein said smoothing step is turned on when it is determined that the resolution of the input image is lower than the resolution of said reproducing device in said comparison step.

72. An image processing method according to claim 70, wherein said smoothing step includes a first smoothing step and a second smoothing step, said first smoothing step including the steps of:

discriminating a point position which is not an object of smoothing on the basis of the connection relation between the predetermined number of consecutive vectors in the vector data extracted by said contour extraction step;

deleting the vector data which forms a closed-loop extracted by said contour extraction step when the vector data has a size smaller than or equal to a predetermined size;

deleting the vector data which forms an irregularity having a size smaller than or equal to a predetermined size when the irregularity is present within a region having a predetermined length in the extracted vector data and for connecting the vectors located in advance of and beyond the irregularity; and allowing for a slanting vector by deleting a plurality of vertical or horizontal vectors in the predetermined number of vectors on the basis of a length and a direction of each of the consecutive predetermined number of vectors and by correcting a starting or ending coordinate position of each of the remaining vectors, said second smoothing step including the steps of:

correcting the starting or ending point position of the single vector in the consecutive vector data smoothed by said first smoothing step except for the point which is not determined as the object of smoothing by said discrimination step by calculating a weighted means of the starting or ending point coordinates of the plurality of vectors located in advance of beyond the single vector.

73. An image processing apparatus comprising:

contour extraction means for extracting contour vector data along an edge of an input image;

smoothing means for smoothing the extracted contour vector data; and generation means for generating an output image according to the contour vector data which has been smoothed by said smoothing means, said apparatus further comprising:

counting means for counting a number of points representing vectors in each of contour closed-loops extracted by said contour extraction mean;

detection means for detecting a size of each of the closed loops on the basis of the extracted contour vector data; and control means for controlling whether said smoothing means is turned on for each of the closed loops on the basis of the size of each of the closed loops detected by said detection means and the number of vector points corresponding to each of the closed loops.

74. An image processing method comprising the steps of:

extracting contour vector data along an edge of an input image;

smoothing the extracted contour vector data; and generating an output image on the basis of the contour vector data which has been smoothed in said smoothing step, said method further comprising the steps of:

counting a number of points representing vectors in each of contour closed-loops extracted in said contour extraction step;

detecting a size of each of the closed loops on the basis of the extracted contour vector data; and controlling whether said smoothing process is turned on for each of the closed loops on the basis of the size of each of the closed loops detected in said detection step and the number of vector points corresponding to each of the closed loops.

75. An image processing apparatus in which an input image is enlarged or reduced and is then output, said apparatus comprising:

contour extraction means for extracting contour vector data along an edge of the input image;

smoothing means for smoothing the extracted contour vector data;

enlargement or reduction means for enlarging or reducing the contour vector data from said contour extraction means or said smoothing means separately for each of plural axes in an orthogonal coordinate system;

detection means for detecting a degree of inclination of the input image; and image conversion means for correcting the input image or the vector data which has been smoothed by said smoothing means according to the detected degree of inclination and thereby converting the input image or the vector data into an erected image.

76. An image processing apparatus according to claim 75, wherein said smoothing means includes first smoothing means and second smoothing means, said first smoothing means including:

discrimination means for discriminating a point position which is not an object of smoothing on the basis of the connection relation between the predetermined number of consecutive vectors in the vector data extracted by said contour extraction means;

deletion means for deleting the vector data which forms a closed-loop extracted by said contour extraction means when the vector data has a size smaller than or equal to a predetermined size;

connecting means for deleting the vector data which forms an irregularity having a size smaller than or equal to a predetermined size when the irregularity is present within a region having a predetermined length in the extracted vector data and for connecting the vectors located in advance of and beyond the irregularity; and means for allowing for a slanting vector by deleting a plurality of vertical or horizontal vectors in the predetermined number of vectors on the basis of a length and a direction of each of the consecutive predetermined number of vectors and by correcting a starting or ending coordinate position of the remaining vectors, said second smoothing means including:

means for correcting the starting or ending point position of the single vector in the consecutive vector data smoothed by said first smoothing means except for the point which is not determined as the object of smoothing by said discrimination means by calculating a weighted means of the starting or ending point coordinates of the plurality of vectors located in advance of beyond the single vector.

77. The apparatus according to claim 75, further comprising input means for inputting an image.

78. The apparatus according to claim 77, wherein said input means comprises an image scanner.

79. The apparatus according to claim 75, further comprising generating means for generating an image on the basis of the vector data.

80. The apparatus according to claim 79, further comprising output means for outputting image data generated by said generating means.

81. The apparatus according to claim 79, wherein said output means comprises a printer.

82. An image processing method in which an input image is enlarged or reduced and then output, said method comprising the steps of:

extracting contour vector data along an edge of the input image;

smoothing the extracted contour vector data;

enlarging or reducing the contour vector data from said contour extraction step or said smoothing step separately for each of plural axes in an orthogonal coordinate system;

detecting a degree of inclination of the input image; and correcting the input image or the vector data which has been smoothed in said smoothing step according to the detected degree of inclination and thereby converting the input image or the vector data into an erected image.

83. An image processing method according to claim 82, wherein said smoothing step includes a first smoothing step and a second smoothing step, said first smoothing step including the steps of:

discriminating a point position which is not an object of smoothing on the basis of the connection relation between the predetermined number of consecutive vectors in the vector data extracted by said contour extraction step;

deleting the vector data which forms a closed-loop extracted by said contour extraction step when the vector data has a size smaller than or equal to a predetermined size;

deleting the vector data which forms an irregularity having a size smaller than or equal to a predetermined size when the irregularity is present within a region having a predetermined length in the extracted vector data and for connecting the vectors located in advance of and beyond the irregularity; and allowing for a slanting vector by deleting a plurality of vertical or horizontal vectors in the predetermined number of vectors on the basis of a length and a direction of each of the consecutive predetermined number of vectors and by correcting a starting or ending coordinate position of each of the remaining vectors, said second smoothing step including the steps of:

correcting the starting or ending point position of the single vector in the consecutive vector data smoothed by said first smoothing step except for the point which is not determined as the object of smoothing by said discrimination step by calculating a weighted means of the starting or ending point coordinates of the plurality of vectors located in advance of beyond the single vector.

84. The method according to claim 82, further comprising the step of inputting an image.

85. The method according to claim 84, wherein said inputting step includes inputting an image via an image scanner.

86. The method according to claim 82, further comprising the step of generating an image on the basis of the vector data.

87. The method according to claim 86, further comprising the step of outputting an image generated in said generating step.

88. The method according to claim 87, wherein said outputting step includes outputting the image to a printer.

89. An image processing apparatus in which image data is input and output to a predetermined device, said apparatus comprising:

contour extraction means for extracting contour vector data along an edge of the input image;

smoothing means for smoothing the contour vector data extracted by said contour extraction means;

determination means for determining whether the input image is enlarged or not; and image generation means for selecting either the contour vector data obtained by said contour extraction means or the contour vector data smoothed by said smoothing means according to the results of the determination of said determination means and for generating an enlarged or reduced image on the basis of the selected contour vector data.

90. An image processing apparatus according to claim 89, wherein said determination means makes the determination on the basis of an instruction from an operator.

91. An image processing apparatus according to claim 89, wherein said determination means makes the determination by comparing an output resolution of said predetermined device with a resolution of the input image.

92. An image processing apparatus according to claim 89, wherein said predetermined device is a facsimile apparatus connected to a communication line.

93. An image processing apparatus according to claim 89, wherein said smoothing means includes first smoothing means and second smoothing means, said first smoothing means including:

discrimination means for discriminating a point position which is not an object of smoothing on the basis of the connection relation between the predetermined number of consecutive vectors in the vector data extracted by said contour extraction means;

deletion means for deleting the vector data which forms a closed-loop extracted by said contour extraction means when the vector data has a size smaller than or equal to a predetermined size;

connecting means for deleting the vector data which forms an irregularity having a size smaller than or equal to a predetermined size when the irregularity is present within a region having a predetermined length in the extracted vector data and for connecting the vectors located in advance of and beyond the irregularity; and means for allowing for a slanting vector by deleting a plurality of vertical or horizontal vectors in the predetermined number of vectors on the basis of a length and a direction of each of the consecutive predetermined number of vectors and by correcting a starting or ending coordinate position of the remaining vectors, said second smoothing means including:

means for correcting the starting or ending point position of the single vector in the consecutive vector data smoothed by said first smoothing means except for the point which is not determined as the object of smoothing by said discrimination means by calculating a weighted means of the starting or ending point coordinates of the plurality of vectors located in advance of beyond the single vector.

94. An image processing method in which image data is input and output to a predetermined device, said method comprising the steps of:

extracting contour vector data along an edge of the input image;

smoothing the contour vector data extracted by said contour extraction step;

determining whether the input image is enlarged or not; and selecting either the contour vector data obtained by said contour extraction step or the contour vector data smoothed by said smoothing step according to the results of the determination of said determination step and for generating an enlarged or reduced image on the basis of the selected contour vector data.

95. An image processing method according to claim 94, wherein said determination step is performed on the basis of an instruction from an operator.

96. An image processing method according to claim 94, wherein said determination step is performed by comparing an output resolution of said predetermined device with a resolution of the input image.

97. An image processing method according to claim 94, wherein said predetermined device is a facsimile apparatus connected to a communication line.

98. An image processing method according to claim 94, wherein said smoothing step includes a first smoothing step and a second smoothing step, said first smoothing step including the steps of:

discriminating a point position which is not an object of smoothing on the basis of the connection relation between the predetermined number of consecutive vectors in the vector data extracted by said contour extraction step;

deleting the vector data which forms a closed-loop extracted by said contour extraction step when the vector data has a size smaller than or equal to a predetermined size;

deleting the vector data which forms an irregularity having a size smaller than or equal to a predetermined size when the irregularity is present within a region having a predetermined length in the extracted vector data and for connecting the vectors located in advance of and beyond the irregularity; and allowing for a slanting vector by deleting a plurality of vertical or horizontal vectors in the predetermined number of vectors on the basis of a length and a direction of each of the consecutive predetermined number of vectors and by correcting a starting or ending coordinate position of each of the remaining vectors, said second smoothing step including the steps of:

correcting the starting or ending point position of the single vector in the consecutive vector data smoothed by said first smoothing step except for the point which is not determined as the object of smoothing by said discrimination step by calculating a weighted means of the starting or ending point coordinates of the plurality of vectors located in advance of beyond the single vector.

* * * * *

UNITED STATES PATENT AND TRADEMARK OFFICE
CERTIFICATE OF CORRECTION

PATENT NO. : 5,644,366

DATED : July 1, 1997

INVENTOR(S): KATSUTOSHI USHIDA ET AL.

It is certified that error appears in the above-identified patent and that said Letters Patent is hereby corrected as shown below:

COLUMN 1

Line 55, "the noises" should read --noise--;
Line 62, "either" should read --each--;
Line 63, "an" should read --a--.

COLUMN 2

Line 57, "through" should read --and--.

COLUMN 4

Line 13, "position" should read --positioned--.

COLUMN 5

Line 18, "as" should read --as to--.

COLUMN 6

Line 64, "to the" should be deleted (first occurrence).

COLUMN 11

Line 43, "receives" should read --receive--;
Line 47, "pixel" should read --pixels--.

UNITED STATES PATENT AND TRADEMARK OFFICE
CERTIFICATE OF CORRECTION

PATENT NO. : 5,644,366

DATED : July 1, 1997

INVENTOR(S): KATSUTOSHI USHIDA ET AL.

It is certified that error appears in the above-identified patent and that said Letters Patent is hereby corrected as shown below:

COLUMN 13

Line 18, "coordinate" should read --coordinates--;
  Line 20, "outlines" should read --points-- (second
    occurrence);
  Line 21, delete "(closed loop of the outline".

COLUMN 15

Line 37, "it" should read --if it--;
  Line 38, "Described" should read --described--.

COLUMN 19

Line 46, "affin" should read --affine--.

COLUMN 20

Line 17, "affin" should read --affine--.

COLUMN 23

Line 7, "is" should be deleted;
  Line 20, "516" should read --516.--

COLUMN 25

Line 25, "be" should read --by--.

UNITED STATES PATENT AND TRADEMARK OFFICE
CERTIFICATE OF CORRECTION

PATENT NO. : 5,644,366
DATED : July 1, 1997
INVENTOR(S) : KATSUTOSHI USHIDA ET AL.

It is certified that error appears in the above-identified patent and that said Letters Patent is hereby corrected as shown below:

COLUMN 31

Line 19, "sized" should read --size--.

COLUMN 32

Line 35, "vector" should read --vectors--.

COLUMN 36

Line 19, "claim 79," should read --claim 80,--.

Signed and Sealed this

Fifteenth Day of September, 1998

Attest:

BRUCE LEHMAN

Attesting Officer

Commissioner of Patents and Trademarks